(12) United States Patent
Hubley

(10) Patent No.: US 11,416,861 B1
(45) Date of Patent: Aug. 16, 2022

(54) SYSTEMS AND METHODS FOR AUTOMATED INTEGRATION BETWEEN PAYMENT FACILITATORS AND SUBMERCHANTS

(71) Applicant: Worldpay, LLC, Symmes Township, OH (US)

(72) Inventor: Marlena Hubley, Lowell, MA (US)

(73) Assignee: WORLDPAY, LLC

( * ) Notice: Subject to any disclaimer, the term of this patent is extended or adjusted under 35 U.S.C. 154(b) by 614 days.

(21) Appl. No.: 16/230,415

(22) Filed: Dec. 21, 2018

(51) Int. Cl.
   *G06Q 40/06* (2012.01)
   *G06Q 20/40* (2012.01)
   *G06F 16/23* (2019.01)

(52) U.S. Cl.
   CPC ..... *G06Q 20/4014* (2013.01); *G06F 16/2365* (2019.01); *G06Q 20/409* (2013.01)

(58) Field of Classification Search
   CPC .. G06Q 20/4014; G06Q 20/409; G06Q 20/32; G06Q 20/14; G06Q 40/00; G06F 16/2365
   USPC ......................................................... 705/44
   See application file for complete search history.

(56) References Cited

U.S. PATENT DOCUMENTS

| 7,177,836 B1* | 2/2007 | German | G06Q 40/12 |
| | | | 705/40 |
| 2003/0126094 A1* | 7/2003 | Fisher | G06Q 20/26 |
| | | | 705/75 |
| 2005/0246627 A1* | 11/2005 | Sayed | G06Q 30/06 |
| | | | 715/234 |
| 2013/0138563 A1* | 5/2013 | Gilder | G06Q 20/4016 |
| | | | 705/44 |
| 2013/0218738 A1* | 8/2013 | Senapati | G06Q 30/0601 |
| | | | 705/35 |
| 2015/0286997 A1* | 10/2015 | Zimmerman | G06Q 20/023 |
| | | | 705/39 |
| 2019/0066246 A1* | 2/2019 | David | G06F 16/90335 |

FOREIGN PATENT DOCUMENTS

KR 1634980 B1 * 7/2016 ........... G06Q 20/204

OTHER PUBLICATIONS https://www.agilepayments.com/payment-facilitation.*
(Continued)

*Primary Examiner* — I Jung Liu
(74) *Attorney, Agent, or Firm* — Bookoff McAndrews, PLLC

(57) ABSTRACT

Systems and methods are disclosed for automated integration between payment facilitators and submerchants. One method includes receiving and storing an identifier and financial information of a payment facilitator, registering the payment facilitator as a user of a user interface, receiving a command from the payment facilitator, the command being one of: register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant, view or edit details of the legal entity or the submerchant, perform a search of legal entities or submerchants associated with the payment facilitator, using one or more search criteria, and add, view, edit, and assign fee profiles.

20 Claims, 15 Drawing Sheets

(56) References Cited

OTHER PUBLICATIONS https://www.ach-payments.com/payment-aggregation/.*
https://www.finixpayments.com/blog/what-is-the-history-of-payment-facilitation/.*
Craig Vaream, Image Deposit Solutions, Nov. 2005, JP Morgan Chase, web, 1-13 (Year: 2005).*

* cited by examiner

| PAYMENT FACILITATOR PORTAL ▼ | | | |
|---|---|---|---|
| ∨ VIEW SUBMERCHANT | | | DISABLE EDIT |
| ∨ SUMMARY | | | |
| SUBMERCHANT ID<br>82041832725732727257 | REQUEST DATE ~706<br>06/07/2016 | UNDERWRITING ANALYST DECISION DATE:<br>06/07/2016 | |
| LAST MODIFIED DATE<br>06/07/2016 08:16 AM | BACKGROUND CHECK STATUS ~712<br>APPROVED | PROCESSING STATUS:<br>APPROVED | |
| | CONNECTIVITY CREDENTIALS ~716 | PAYPAGE CREDENTIALS | |
| ∨ PAYMENT PROCESSING CONFIGURATION | | | |
| PAYMENT FACILITATOR SUB-MERCHANT ID:<br>12345611 | MERCHANT NAME: ~724<br>TESTUS | MERCHANT CATEGORY CODE:<br>6513 | |
| DEFAULT FILING DESCRIPTION:<br>PSP* | CUSTOMER SERVICE PHONE: ~734<br>9814891891 | URL:<br>COM.COM | |
| AMEX MERCHANT ID:<br> | DISCOVER MERCHANT ID: | CREATE CONNECTIVITY CREDENTIALS<br>NO | |
| ENABLE ECHECK TRANSACTIONS<br> | ECHECK BILLING DESCRIPTOR | ECHECK COMPANY NAME | |
| SUBMERCHANT FUNDING ENABLED<br>NO | FEE PROFILE ~740 | TAX AUTHORITY INFORMATION | |
| PURCHASE CURRENCY: ~794<br>USD | SETTLEMENT CURRENCY: ~792<br>USD | AMEX SELLER ID:<br>12727411272716727162927 | |
| MAX TRANSACTION AMOUNT:<br>1000 | | AMEX REQUIRED:<br>NO | |
| ANNUAL CREDIT CARD SALES VOLUME:<br>1000 | ACCEPTED CREDIT CARDS IN THE PAST.<br>YES | ADDRESS:<br>900 CHELMSFORD STREET<br>LOWELL<br>AR<br>01851<br>USA | |

✓ LEGAL ENTITY DETAILS

✓ LEGAL ENTITY (APPLICABLE FOR BACKGROUND CHECKS) ⓘ SCORE - 0 NOTHING FOUND TO CONFIRM EXISTENCE OF BUSINESS [EDIT] [ADD PRINCIPAL]

| LEGAL ENTITY ID: — 764<br>2231223122312231 | NAME:<br>CHICAGO RESEARCH ⓘ — 760 | EIN/TAX ID: — 758<br>000000000 ⓘ |
|---|---|---|
| IRS TAX ID VALIDATION STATUS:<br>FAILED — 772 | TYPE: — 762<br>INDIVIDUAL/SOLE PROPRIETORSHIP | DOING BUSINESS AS: — 766 |
| CONTACT PHONE: — 768 | ADDRESS:<br>13 N DEAR ST ⓘ — 770<br>ⓘ<br>CHICAGO ⓘ<br>IL ⓘ<br>60610 ⓘ<br>USA | YEARS IN BUSINESS: — 774 |

| LEGAL ENTITY BACKGROUND CHECK RESULTS (ADDITIONAL INFORMATION) | | |
|---|---|---|
| UNDERWRITING ANALYST NOTES: — 776 | NAME, ADDRESS, AND TAX ID ASSOCIATION — 778 | NAME, ADDRESS, AND PHONE ASSOCIATION — 780 |
| BUSINESS & PRINCIPAL RELATIONSHIP:<br>NO ASSOCIATION FOUND<br>— 782 | POTENTIAL RISK INDICATORS:<br>○ UNABLE TO VERIFY NAME, ADDRESS, SSN/TIN AND PHONE<br>○ UNABLE TO VERIFY ADDRESS<br>○ UNABLE TO VERIFY SSN/TIN<br>○ UNABLE TO VERIFY NAME<br>○ THE INPUT BUSINESS ADDRESS MAY BE A RESIDENTIAL ADDRESS (SINGLE FAMILY DWELLING)<br>○ THE INPUT PHONE WAS MISSING OR INCOMPLETE<br>— 784 | RECENT BANKRUPTCY FILING:<br>— 786 |
| RECENT JUDGMENT/LIEN FILING: — 788 | | |

✓ PRINCIPAL OWNER ❶ SCORE - 10 CRITICAL ID ELEMENTS NOT VERIFIED, ARE ASSOCIATED WITH DIFFERENT PERSON(S), OR INDICATIONS SUCH AS OFAC MATCHES, DECEASED/INVALID SSN, OR SSN ISSUED PRIOR TO BIRTH DATE PROVIDED, ETC. EXIST [DELETE] [EDIT]

| PRINCIPAL ID: 1 | NAME: JOHN FITNESS ❶ | SSN: 000000000 ❶ | DATE OF BIRTH: 01/01/1963 ❶ |
|---|---|---|---|
| ADDRESS: USA | TITLE: | EMAIL ADDRESS: FITNESS@GMAIL.COM | CONTACT PHONE: 7777775277 |
| | DRIVERS LICENSE: | DRIVERS LICENSE STATE: | STAKE PERCENT: 45 — 792 |

| PRINCIPAL OWNER BACKGROUND CHECK RESULTS (ADDITIONAL INFORMATION) | |
|---|---|
| NAME, ADDRESS, AND SSN ASSOCIATION: | NAME, ADDRESS, AND PHONE ASSOCIATION: |
| | POTENTIAL RISK INDICATORS:<br>○ THE INPUT SSN IS INVALID<br>○ UNABLE TO VERIFY SSN/TIN<br>○ UNABLE TO VERIFY PHONE NUMBER<br>○ THE INPUT LAST NAME IS NOT ASSOCIATED WITH THE INPUT SSN<br>○ THE INPUT SSN IS ASSOCIATED WITH A DIFFERENT NAME AND ADDRESS<br>○ ADDRESS MISMATCH ON SECONDARY ADDRESS RANGE |
| RECENT BANKRUPTCY FILING: | RECENT JUDGMENT/LIEN FILING: |

| PAYMENT FACILITATOR PORTAL ▼ | | | | | | |
|---|---|---|---|---|---|---|
| PAYMENT FACILITATOR SEARCH | | | | | | |
| ∨ SEARCH CRITERIA | | | | | FIELD LEVEL HELP [ON] [OFF] | |
| PAYMENT FACILITATOR SUBMERCHANT ID: ☐ — 808 | | | EIN/TAX ID: ☐ — 810 | | STATUS: [ALL ▽] — 812 | |
| LEGAL ENTITY NAME: ☐ | | | SUBMERCHANT NAME: ☐ — 816 | | | |
| | | | REQUEST DATE RANGE: [11/12/2014 - 11/19/2014] — 818 | | | |
| | | | | | [CLEAR] [SEARCH] | |
| | | | | | | ⊠ — 806 |
| ∨ SEARCH RESULTS | | | | | | |
| PAYMENT FACILITATOR SUBMERCHANT ID | TAX ID | SUBMERCHANT NAME | INTEGRATION SERVER SUBMERCHANT ID | LEGAL ENTITY NAME | REQUEST DATE | STATUS |
| 1111 | 333333333 | A MERCHANT | 01103822 | A LE NAME | 07/10/2013 | APPROVED |

SUPPORT | FEEDBACK

| PAYMENT FACILITATOR PORTAL ▼ | |
|---|---|
| FEE PROFILES | [ADD] |

FEE PROFILES

| NAME | NUMBER OF SUBMERCHANTS |
|---|---|
| DEFAULT_BILL_PROFILE_18 | 1 |
| DEFAULT_BILL_PROFILE_7 | 1 |
| DEFAULT_BILL_PROFILE_80 | 1 |
| DEFAULT_BILL_PROFILE_83 | 1 |
| DEFAULT_BILL_PROFILE_86 | 1 |
| DEFAULT_BILL_PROFILE_95 | 1 |
| DEFAULT_BILL_PROFILE_98 | 1 |

SUPPORT | FEEDBACK

PAYMENT FACILITATOR PORTAL ▼

ADD FEE PROFILE

ⓘ PLEASE NOTE THAT THE FEE PROFILE WILL BE AVAILABLE FROM TOMORROW TO ASSIGN IT TO A SUBMERCHANT

∨ BASIC DETAILS

NAME: [ ]

∨ FEES FOR APPROVED TRANSACTIONS

902 — ∨ DEPOSITS

| FEE | FLAT RATE | PRECENT RATE |
|---|---|---|
| PAYMENT FACILITATOR FEE FOR VISA DEPOSIT | $ | % |
| PAYMENT FACILITATOR FEE FOR MASTERCARD DEPOSIT | $ | % |
| PAYMENT FACILITATOR FEE FOR ECHECK DEPOSIT | $ | % |
| PAYMENT FACILITATOR FEE FOR DISCOVER CARD DEPOSIT | $ | % |
| PAYMENT FACILITATOR FEE FOR AMEX DEPOSIT | $ | % |

908 — ∨ CHARGEBACKS

| FEE | FLAT RATE |
|---|---|
| PAYMENT FACILITATOR FEE FOR VISA REFUND 1ST CHARGEBACK | $ |
| PAYMENT FACILITATOR FEE FOR VISA 1ST CHARGEBACK | $ |
| PAYMENT FACILITATOR FEE FOR MASTERCARD REFUND 1ST CHARGEBACK | $ |
| PAYMENT FACILITATOR FEE FOR MASTERCARD 1ST CHARGEBACK | $ |
| PAYMENT FACILITATOR FEE FOR ECHECK RETURN-REFUNDS | $ |
| PAYMENT FACILITATOR FEE FOR ECHECK RETURN-DEPOSITS | $ |
| PAYMENT FACILITATOR FEE FOR DISCOVER REFUND 1ST CHARGEBACK | $ |
| PAYMENT FACILITATOR FEE FOR DISCOVER 1ST CHARGEBACK | $ |
| PAYMENT FACILITATOR FEE FOR AMERICAN EXPRESS REFUND 1ST CHARGEBACK | $ |
| PAYMENT FACILITATOR FEE FOR AMERICAN EXPRESS 1ST CHARGEBACK | $ |

910 — ∨ REFUNDS

| FEE | FLAT RATE |
|---|---|
| PAYMENT FACILITATOR FEE FOR VISA REFUND | $ |
| PAYMENT FACILITATOR FEE FOR MASTERCARD REFUND | $ |
| PAYMENT FACILITATOR FEE FOR ECHECK REFUND | $ |
| PAYMENT FACILITATOR FEE FOR DISCOVER CARD REFUND | $ |
| PAYMENT FACILITATOR FEE FOR AMEX REFUND | $ |

*FIG. 9B*

SYSTEMS AND METHODS FOR AUTOMATED INTEGRATION BETWEEN PAYMENT FACILITATORS AND SUBMERCHANTS

FIELD OF DISCLOSURE

The present disclosure relates generally to the field of payment transactions and, more particularly, to automated integration between payment facilitators and submerchants.

BACKGROUND

Electronic transactions and networks are used for a great number of purchases and sales between merchants and cardholders. A normal card transaction may involve a number of parties, including a cardholder, who possesses a card, a merchant, a submerchant, a payment facilitator, an acquirer processor, an issuer processor, an issuer financial institution, and a card association network. Millions of such transactions occur daily at merchants using a variety of payment card types, such as, for example, credit cards, debit cards, prepaid cards, and so forth. In the field of payments processing, a payment facilitator may contract with an acquirer processor, which refers to a financial institution that processes credit and/or debit card transactions, to provide payment processing services to the payment facilitator's own submerchants/clients. In the aforementioned arrangement, submerchant clients of the payment facilitator may accept customer payments for goods and services through point-of-sale ("POS") terminals and corresponding payment processing applications. Conventionally, the payment data collected during a cardholder transaction at the submerchant POS is transmitted to a payment facilitator, and then transmitted from a payment facilitator to an acquirer processor, for processing. Conventional methods primarily utilize this data to authorize transactions, facilitate the transfer of funds from one account to another and detect fraud. However, there is a need for a centralized system that integrates the payment facilitators and the submerchant clients together, and which provides a user interface for the payment facilitators to better manage the transactions from their submerchants, utilize submerchant transactional information to make better decisions, and provide better payout options. For example, there is a desire for a system that may better facilitate a payment facilitator's relationship with submerchants, aggregate the payments from the respective submerchants, assume financial liability for the submerchants, and/or control the customer experience of submerchants.

SUMMARY

According to certain aspects of the present disclosure, systems and methods are disclosed for automated integration between payment facilitators and submerchants.

In one embodiment, a computer-implemented method is disclosed for automated integration between payment facilitators and submerchants. The method comprises: receiving and storing an identifier and financial information of a payment facilitator, registering the payment facilitator as a user of a user interface, receiving a command from the payment facilitator, the command being one of: register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant, view or edit details of the legal entity or the submerchant, perform a search of legal entities or submerchants associated with the payment facilitator, using one or more search criteria, and add, view, edit, and assign fee profiles.

In accordance with another embodiment, computer systems are disclosed for automated integration between payment facilitators and submerchants. The system comprises: a memory having processor-readable instructions stored therein; and one or more processors configured to access the memory and execute the processor-readable instructions, which when executed by the processors configures the processors to perform a plurality of functions, including functions for: register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant, view or edit details of the legal entity or the submerchant, perform a search of legal entities or the submerchants associated with the payment facilitator, using a search criteria, and add, view, edit, and assign fee profiles to the legal entity or the submerchant.

In accordance with another embodiment, a non-transitory machine-readable medium is disclosed for automated integration between payment facilitators and submerchants. The non-transitory computer readable medium includes a memory having processor-readable instructions stored therein, to direct one or more processors to perform the functions of: register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant, view or edit details of the legal entity or the submerchant, perform a search of legal entities or submerchants associated with the payment facilitator, using one or more search criteria, and add, view, edit, and assign fee profiles to the legal entity or the submerchant.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

FIGS. 7A-7E, 8, and 9A-9B depict exemplary screenshots of a user interface platform for a system of automated integration and payout funding between payment facilitators and submerchants, displaying exemplary data fields for adding and viewing submerchants, payment facilitator searches, and fee profiles, in accordance with non-limiting embodiments.

DETAILED DESCRIPTION

Figure 1:
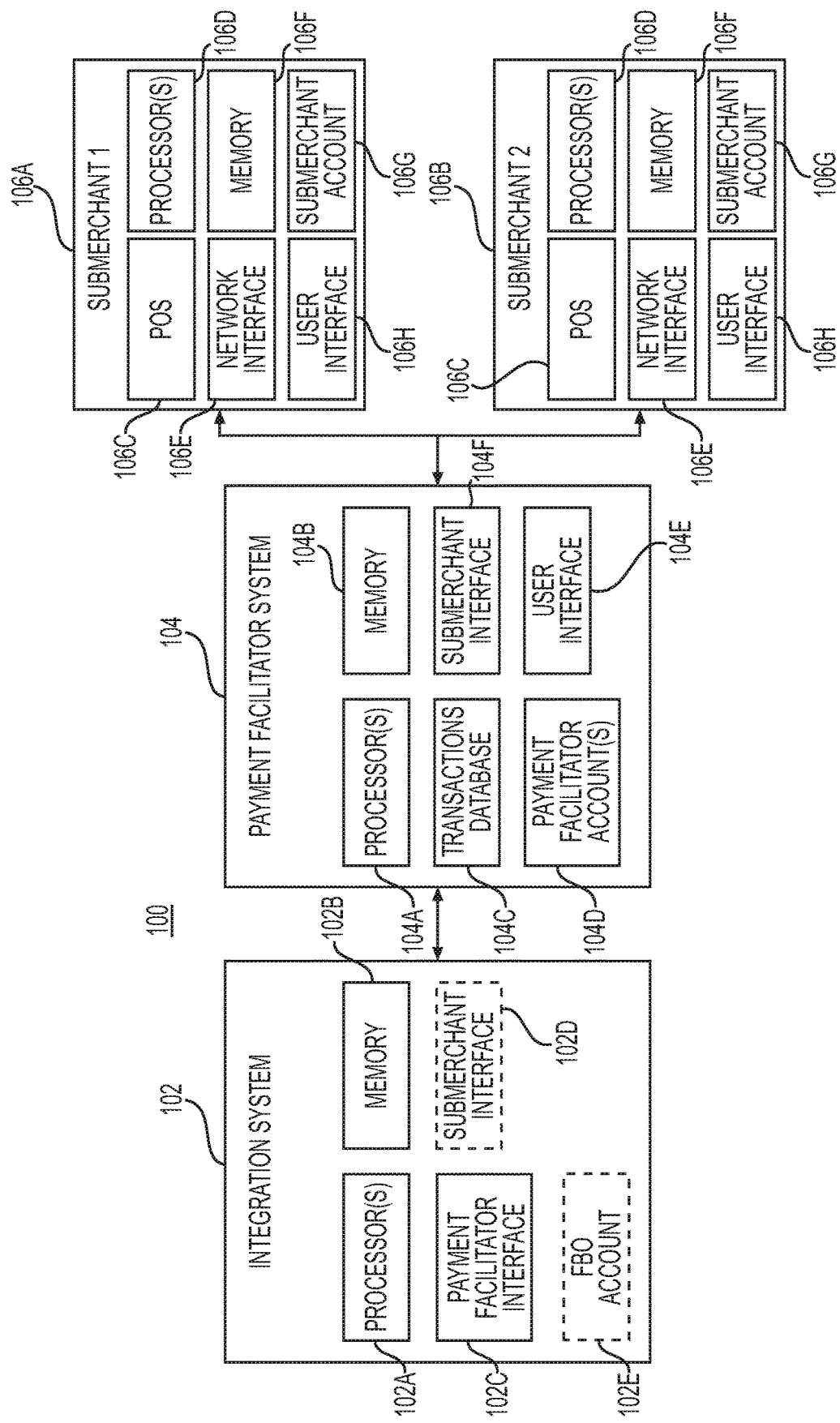
FIG. 1 depicts an environment for automated integration and payout funding between payment facilitators and submerchants, in accordance with non-limiting embodiments.

Various non-limiting embodiments of the present disclosure will now be described to provide an overall understanding of the principles of the structure, function, and use of systems and methods disclosed herein for automated integration and payout funding between payment facilitators and submerchants.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Overview of the Network for Integration Between Payment Facilitators and their Submerchant Clients As described above, there is a desire for a system ("integration system(s)" or "system(s) for integration") that improves integration between the payment facilitators and submerchants, and provides a user interface for payment facilitators to receive data on the activity of their submerchant clients and/or the consumers of the submerchant clients to make better business decision. In various embodiments, a payment facilitator may refer to an entity that may contract with integration systems presented herein to provide payment processing services to the submerchant clients of the payment facilitator. A payment facilitator may have primary liability for the processing accounts of its aggregated submerchant clients. The payment facilitator may take on an active role in facilitating transactions by providing a white-labeled payment processing solution as a stand-alone offering, or as part of a broader service offering. Payment facilitators may facilitate the movement of funds on behalf of their sponsored merchants.

In some embodiments, a payment facilitator may engage in a business model involving a technology platform. This technology platform may allow the payment facilitator to facilitate a relationship with submerchants, each of whom may collect payments, aggregate the payments from the respective submerchants, assume financial liability for the submerchants, and/or control the customer experience of submerchants.

FIG. 1 depicts an environment 100 for automated integration and payout funding between payment facilitators and submerchants, in accordance with non-limiting embodiments. Furthermore, FIG. 1 depicts an exemplary embodiment of both the payment facilitator's relationship with an exemplary system for the integration between payment facilitators and submerchants (e.g., "Integration system"), described in this disclosure, as well as the payment facilitator's relationship with its submerchants.

On a high level, environment 100 comprises a centralized server and/or computing system(s) (e.g., integration system 102), which may be responsible for facilitating the integration and payout funding methods between payment facilitators and their respective submerchants and/or legal entities, and for providing various services described in the present disclosure; a server or computing system(s) of each payment facilitator (e.g., payment facilitator system 104); and the various submerchants of each payment facilitator (e.g., submerchant 1 106A, submerchant 2 106B, etc.). It is contemplated that each submerchant may have its own computing systems, device(s), server(s), brick-and-mortar shop(s), etc., which may assist the submerchant in communicating with the integration system 102 and payment facilitator system 104, and may have its own merchant identification (e.g., merchant ID). In some embodiments, integration system 102 may be, or take on various roles of, an acquirer or acquiring institution of the payment facilitator. Electronic transaction data may be collected and transmitted among the above described entities of environment 100 in communication with each other directly, or over electronic networks such as a payment network and the Internet.

A submerchant (e.g., submerchant 1 106A, submerchant 2 106B, etc.) may be any type of merchant or service provider, such as, for example, a brick-and-mortar merchant, an online merchant, a mobile merchant, a kiosk, or any other type of merchant or device configured to receive payment by way of a payment vehicle (not shown). As noted above, a submerchant may contract with a payment facilitator, which may utilize and/or be represented by payment facilitator system 104, to provide payment processing services to the submerchant cardholders.

In one embodiment, a computing system, device, server, or brick-and-mortar shop may include, for example, a point-of-sale (POS) system 106C, one or more processors 106D (e.g., of a computing system or server being used), a network interface 106E, a memory or other storage device(s) or tool(s) to record transaction information (e.g., memory 106F), one or more accounts of the submerchant (e.g., a submerchant account 106G), and user interface 106H. The POS device 106C may be, for example, a computer, mobile POS device, card reader, and/or a mobile phone, etc. Each payment facilitator system 104 may be configured to interact with the one or more POS devices of submerchants 106 via network interface 106E. A submerchant's POS device 106C may comprise an input and output device (not shown). Thus, POS system 106C may be configured to interact with a payment vehicle of a consumer that transacts with the submerchant. Through the POS system 106C, the submerchant 106 may obtain account information about a consumer account affiliated with a cardholder. In one or more embodiments, POS system 106C may include a reader (not shown), which may be, for example, a magnetic strip reader, and so forth. In one or more embodiments, POS system 106C may include a contactless reader (not shown), such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In some embodiments, processor(s) 106D coupled to memory 106F may control the operations of the reader and/or scanner of the POS device 106C, e.g., to obtain account information of the cardholder upon a transaction, and transmit transaction information via network interface 106E. In one or more embodiments, network interface 106E may be configured to communicate with payment facilitator system 104 or integration system 102 over a payment network for example, via a telephone connection, an internet connection, or a dedicated data communication channel. Memory 106F of the submerchant may store instructions for processor(s) 106D and/or data, such as, for example, an identifier that is associated with submerchant's account 106G. Furthermore, processor(s) 106D coupled with memory 106F and network interface 106E may facilitate the transfer of funds from a payment facilitator system 104 or integration system 102 to submerchant's account 106G.

In one or more embodiment, payment facilitator system 104 may include, for example, one or more processors 104A (e.g., of a computing system, device, or server being used), a memory or other storage device(s) or tool(s) (e.g., memory 104B), a transaction database 104C (e.g., to collect, store, reorganize, or analyze transaction information from a plurality of submerchants), payment facilitator account(s) 104D, and user interface 104E. One or more processors 104A coupled with memory 104B may assist in receiving transaction information from submerchants, deducting any necessary fees and processing payments (e.g., as in payment facilitator funded payout described further below). The received transaction information may be mapped to the appropriate submerchant from which it was received, via submerchant interface 104F and stored in transaction database 104C. The transaction information stored in transaction database 104C is meant to be representative and a non-exhaustive list of the various types of data that can be collected during a transaction and stored. Submerchant interface 104F may facilitate the communication or enlisting of the various submerchants of the payment facilitator. In some embodiments, memory 104B may collectively comprise one or more of the transactions database 104C, payment facilitator account(s) 104D, and/or submerchant interface 104F. Payment facilitator account(s) 104D may include one or more operating or bank accounts of the payment facilitator used for receiving and transferring funds for payout funding between a payment facilitator and its submerchants and/or other legal entities of the payment facilitator. In some embodiments, one or more payment facilitator account(s) 104D may be maintained by integration system, such as in "for benefit of" (FBO) account 102E, an acquirer, and/or a third party. For example, in some embodiments, payment facilitator account(s) 104D may be a separate logical account within FBO account 102E of integration system 102. User interface 104E may enable the payment facilitator user to manage payouts, enlist and onboard submerchants and/or other legal entities of the payment facilitator, receive data analytics pertaining to payment transactions originating at the various submerchants and/or legal entities of the payment facilitator, obtain underwriting, legal contract execution, and other value added services from integration system 102.

During a purchase event (i.e., a transaction), network interface 106E and/or POS system 106C of a submerchant 106 may send an authorization request as part of the transaction information for the purchase event obtained from POS system 106C to a payment facilitator, which may store the transaction information into transaction database 104C of payment facilitator system 104. Payment facilitator system 104 may periodically, continually, or immediately send the transaction information to integration system 102 and/or an acquirer. The integration system 102 may process payment transactions for the submerchants using processor(s) 102A. Additional intermediary entities, such as one or more payment gateways, may assist with the handling and routing of an authorization request or other related messaging. For the purposes of illustration, such intermediary entities may be considered part of integration system 102. In various embodiments of the present disclosure, transaction information may include identifying information about a transaction originating from a submerchant. Thus, transaction information may include, for example, identifying information of a payment vehicle used in the transaction (e.g., PIN number, BIN number, an expiration date, etc.), various personally identifiable information (e.g., a first and last name of the cardholder), geographical data (regarding location data for submerchants, payment facilitators and cardholders), product data, service data, payment facilitator identifying information, and submerchant information, etc. The transaction information may further include, for example, identifying information from the purchase, such as an amount (i.e., cost of goods/service, taxes charged, conversion rates, etc.), and identifying information of submerchant 106 (i.e., merchant ID, merchant category code (MCC), etc.).

It is also contemplated that at least integration system 102 and/or payment facilitator system 104 may receive multiple transaction information (e.g., "collective transaction information") collected from one or more submerchants of payment facilitator system 104 for a plurality of transactions over a predetermined period of time. In at least such embodiments, the transaction information may also include an identification of a transaction type (e.g., an authorization transaction, a partial capture transaction, an authorization transaction using the address verification system (AVS) ("AVS Only" transaction), an authorization reversal, a capture transaction, a capture given authorization transaction, a credit transaction, a sale transaction, a void transaction, etc.), and may include details regarding the specified transaction type.

In one or more embodiments, transaction information may be analyzed and used to generate analytics and predictive data, which may be transmitted to and/or displayed to a payment facilitator system 104 via user interface 104E, or to the submerchant, as will be discussed further. Submerchants and payment facilitators may utilize various user interface platforms described further below (e.g., payment facilitator API, payment facilitator portal, etc.) to, for example, research and analyze submerchant transaction patterns; view financial data pertaining to revenue and profit data, income, historical information, and documents related to partnering with the payment facilitator (e.g., insurance, licensing and contractual documents); view and edit product inventory; view and edit service offerings; run reports; gather demographic information pertaining to employees, cardholders or geographical locations; edit subscription plans; send and receive messages; and receive acquirer processor-generated notifications (e.g., recommendations) and predictive analytics data, etc. Furthermore, through these user interface platforms, payment facilitator system 104 may enlist and onboard their respective submerchants 106 and/or legal entities, facilitate payout funding, and utilize other value added services.

As noted above, each submerchant may be considered a customer, subsidiary, or contractor of its respective payment facilitator 104 (e.g., a franchisee, a ridesharing partner, stall, booth, subsidiary, etc.). The collective transaction information aggregated by integration system 102 may be manipulated by various modules executing on processor(s) 102A of integration system 102.

In some embodiments, integration system 102 may include, but is not limited to, processor(s) 102A (e.g., of a computing system, device, or server being used), memory or other storage device(s) or tool(s) (e.g., memory 102B), and a payment facilitator interface 102C. In some embodiments to, for example, facilitate a managed or dynamic payout, as will be described further below, integration system 102 may further include a submerchant interface 102D and one or more "for benefit of" (FBO) account(s) 102E. One or more processors 102A coupled with memory 102B may assist in receiving collective transaction information from payment facilitator systems 104 or their submerchants 106, deducting any necessary fees, and processing payments (e.g., as in, for example, managed or dynamic payout methods described further below). The received transaction information may be mapped to the appropriate submerchant from which it was received, via submerchant interface 102D. In some embodiments, payment facilitator interface 102C may register payment facilitators into the integration system, store financial and identifying information of each payment facilitator, and analyze or manipulate the stored data. Integration system 102 may receive information pertaining to a submerchant, enlist or perform onboarding of the submerchants using submerchant interface 102D and map the information to the submerchant's corresponding payment facilitator using payment facilitator interface 102C. As will be described further in the disclosure, FBO Account 102E may be a reserve account used by or designated for multiple payment facilitators to hold or accumulate funds from settled transactions.

In some embodiments, integration system 102 may hold standard requirements with regard to underwriting and risk processes, procedures, and documentation for underwriting and monitoring. These standards may be predetermined and/or be known to those having ordinary skill in the art. Thus, integration system 102 may prompt or require that a payment facilitator comply with these standard requirements. Payment facilitator system 104 may prompt the payment facilitator's respective submerchants 106 (e.g., submerchant 1 106A and submerchant 2 106B) to also comply with the standard requirements (e.g., the underwriting policies and practices of the payment facilitator, or as dictated by the integration system). Furthermore, the payment facilitator (via payment facilitator system 104) or the submerchants may be provided with funding, legal contract execution services, and other optional value-added services on their respective computing systems, by integration system 102. The payment facilitator user or the submerchant 106 may also be equipped with a reporting interface (e.g., user interface 104E of payment facilitator system 104 or user interface 106H of the submerchants' computer systems or devices) and be offered customer service to be able to better understand or facilitate participation in the above described interactions.

In some embodiments, the payment facilitator and/or its submerchants may be held or prompted to comply with Payment Card Industry (PCI) compliance and registration requirements before being integrated to the integration system.

Onboarding

In various embodiments, an onboarding process may refer to the registration and/or "signing up" of a payment facilitator and/or its submerchants to the systems for integration, as described in this disclosure. The onboarding may involve background checks and/or an evaluation of compliance with the standard requirements described above with respect to FIG. 1. The onboarding of the payment facilitator may be performed by an integrated partner (e.g., an already onboarded payment facilitator), or through a non-integrated third party.

The onboarding of submerchants may depend on the quantity of submerchant clients of a payment facilitator. For example, if a payment facilitator has a large quantity of submerchant clients, the onboarding process may involve a payment facilitator Application Program Interface (API), of which at least some embodiments are described in detail further in this disclosure. Likewise, if a payment facilitator does not have a large quantity of submerchant clients, the onboarding process may involve a payment facilitator portal, of which at least some embodiments are also described in detail further in this disclosure.

In one embodiment, a payment facilitator API may be an XML based RESTful API that may allow a payment facilitator user to create and update legal entities and submerchants, as well as retrieve information about existing legal entities and submerchants in near real-time. A "legal entity" may refer to an entity that owns one or more submerchants. For example, Joe's Gyms LLC could be the legal entity owning Joe's Main St. Gym and Joe's South St. Gym.

In addition to the payment facilitator API, a payment facilitator user may use the payment facilitator portal to onboard legal entities and/or submerchants. The payment facilitator portal may be a user interface built on top of the payment facilitator API and may offer similar capabilities, and will be described in detail further in this disclosure.

Pay Out Options

It is contemplated that payment facilitators may be involved with funding or obtaining funds from their respective submerchants. Some embodiments of the system for integrating payment facilitator systems 104 and submerchants 106 may include funding methods supported by the integration system 102 for payment facilitator systems 104. These funding methods may include, but are not limited to, a payment facilitator-funded payout, a managed payout, and a dynamic Payout. While some payment facilitators may elect to fund their submerchants directly (e.g., a payment facilitator-funded payout), the managed payout and the dynamic payout may provide benefits that may not necessarily exist in the payment facilitator funded payout.

For example, managed payout and dynamic payout options may provide operational efficiencies (e.g., by simplifying and consolidating reconciliation, outsourcing the creation of 1099 K forms), possibly alleviating the need for home-grown funding engine(s), and/or possibly eliminating accounts receivable (e.g., if doing end-of-month invoicing). Furthermore, the managed payout and the dynamic payout options may provide improved customer service, e.g., by reducing funding delays to the payment facilitator's submerchant clients, displaying or indicating the payment facilitator name in fund disbursements to submerchants, and providing tools (e.g., on the payment facilitator portal, payment facilitator API, and/or payment facilitator analytic dashboard) to increase efficiency of handling customer service calls.

1. Payment Facilitator Funded Payout

Some payment facilitators may retain the responsibility for funding their submerchants themselves, and may opt for a payment facilitator funded method of payout. Using this method, integration system 102 may move funds from accounts held by integration system 102 (e.g., "integration accounts") to the payment facilitator account after deducting costs incurred from assessments, interchange charges, and fees ("net settled sales"). Once the funds are in the payment facilitator's account, the payment facilitator may distribute these funds to their submerchants, less the payment facilitator's own fees, per the payment facilitator's contractually agreed upon schedule with its submerchants.

2. Managed Payout

The managed payout funding method may include prompting the payment facilitator to establish fee profiles using the payment facilitator portal. Each fee profile a payment facilitator establishes can include fees for both approved and declined transactions by card type (e.g., Visa, MasterCard, Discover, and American Express) and/or for eChecks. The transactions may include, for example, an authorization, a capture (or deposit), or a refund, as will be described later in the present disclosure. For each fee transaction, a payment facilitator can specify a flat charge, a percentage of the transaction, or a combination of the two. For chargebacks, a payment facilitator can specify a flat rate fee for the first chargebacks, the refund chargebacks, and/or for eCheck returns.

Once a payment facilitator has created the payment facilitator's fee profiles, the payment facilitator may assign them to submerchants using, e.g., the payment facilitator API or the payment facilitator portal. Based upon the assigned profile, the integration system may distribute funds to the payment facilitator's submerchants and/or to the payment facilitator periodically (e.g., each day).

Figures 2A, 2B:
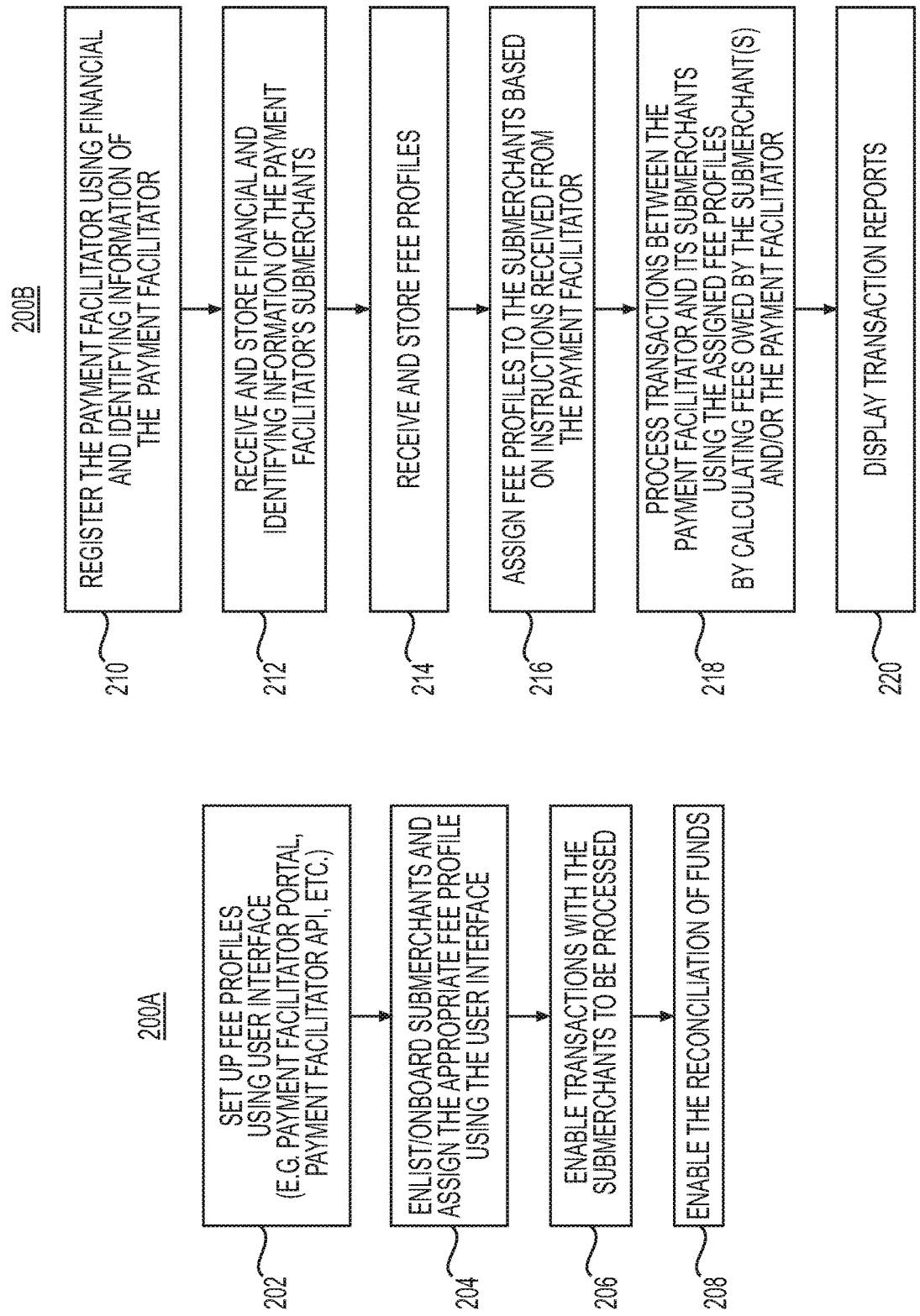
FIGS. 2A-2B depict block diagrams of a general method of managed payout funding, in accordance with non-limiting embodiments.

FIGS. 2A-2B depict block diagrams of general methods 200A and 200B of managed payout funding, as performed by the payment facilitator and the integration server, respectively, in accordance with non-limiting embodiments.

As shown in FIG. 2A, at step 202, a payment facilitator user may set up fee profiles using a user interface of the payment facilitator's computing system. Various embodiments for user interface platforms are described further in the present disclosure, for example, the payment facilitator portal and the payment facilitator API.

Figure 3:
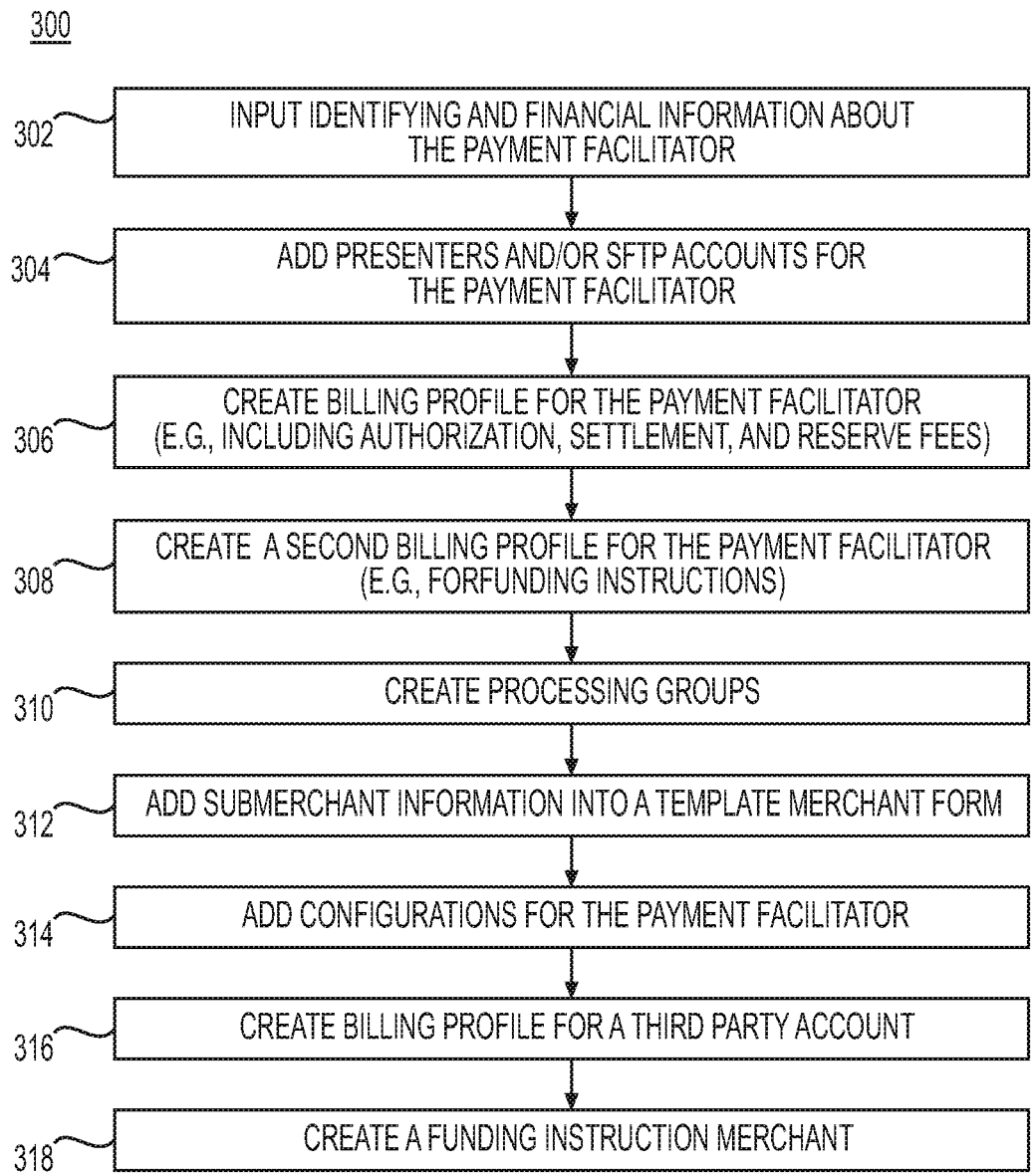
FIG. 3 depicts a block diagram of a general method for dynamic payout funding, in accordance with a non-limiting embodiment.

At step 204, the payment facilitator user may enlist (and onboard) the submerchants (and other legal entities) of the payment facilitator and assign appropriate fee profiles to them using the user interface. For example, step 204 may include inputting identifying and financial information for each submerchant. Method 300, as depicted in FIG. 3 may describe at least one embodiment of the process for enlisting and/or onboarding submerchants and legal entities in more detail.

Step 206 may include enabling transactions with the submerchants to be processed. These transactions may include, for example, transactions between the submerchants and their respective consumers and/or transaction between the payment facilitator and the submerchant (e.g., for utilizing the payment facilitator's services). As will be described further in the disclosure, the types of transactions may include, but are not limited to, an authorization transaction, a partial capture transaction, an "AVS Only" transaction, an authorization reversal, a capture transaction, a capture given authorization transaction, a credit transaction, a sale transaction, a void transaction, etc. In some embodiments, transactions may be processed in batches, for example where a collective transaction information is received periodically from various submerchants over a predetermined duration of time. It is contemplated that at least for some payout methods (e.g., payment facilitator funded payouts), the payment facilitator may process the transaction using one or more accounts of the payment facilitator and one or more processors. Alternatively or additionally, for example in managed or dynamic payout, the transaction may be processed by the integration server periodically or based on input provided by the payment facilitator to the integration server. In such embodiments, step 206 may further include sending a signal to the integration system to process one or more transactions.

Step 208 may include enabling a reconciliation of funds, based on the processing of the transactions. A payment facilitator may be notified of the processing of the transaction and the calculation of the funds to be allocated to the appropriate parties after deductions of any necessary fees. At step 208, the payment facilitator may send a signal to the integration system (e.g., for managed or dynamic payouts) to distribute the funds accordingly. It is contemplated that in some embodiments (e.g., in payment facilitator funded payouts), the payment facilitator may perform the reconciliation.

Referring now to FIG. 2B, method 200B depicts a general method for managed payout performed by the integration system, in accordance with non-limiting embodiments.

It would be understood by those having ordinary skill in the art that for an integration system envisioned in the present disclosure, or any acquirer, to process payouts for a merchants, the merchant may need to identified and its financial information may need to be received and stored (e.g., via "registration"). Thus, step 210 may involve registering the payment facilitator using financial and identifying information of the payment facilitator. Likewise, step 212 may include receiving and storing financial and identifying information of the payment facilitator's submerchants (or other legal entities). Furthermore, step 212 may be performed by one or more processors of the integration system coupled with the submerchant interface or memory in response to the payment facilitator performing step 204.

Step 214 may include receiving and storing the fee profiles that the payment facilitator entered in step 202. The fee profiles may include, for example, the fees to be deducted for each submerchant or category of submerchants. The types of fees and the methods of their deduction may vary. For example a first fee profile may involve a deduction of 2.5% (e.g., of the transaction amount) for a deposit transaction (e.g., fee profile 1: 2.5% on deposit). A second fee profile may involve a deduction of 2.8% (e.g., of the transaction amount) plus an additional deduction of $0.20 for a deposit transaction (e.g., fee profile 2: 2.8%+$0.20 on deposit). In some embodiments, when a payment facilitator combines both a percentage and flat rate, e.g., in the exemplary "fee profile 2," the integration system may deduct the flat fee first and then it may compute the percentage on the remaining amount.

Step 216 may include assigning the fee profiles to the submerchants based on instructions received from the payment facilitator (e.g., in step 204). It is contemplated that step 204 and step 216 may be performed simultaneously. For example, based on the payment facilitator user's input in step 204, the integration system may appropriately map enlisted submerchants to their assigned fee profile using one or more processors coupled with a submerchant interface and/or memory. For example, if three submerchants were enlisted and onboarded for a registered payment facilitator, then in accordance with an input by the payment facilitator, submerchant 1 may be assigned, e.g., fee profile 1, submerchant 2 may be assigned, e.g., fee profile 2, submerchant 3 may be assigned, e.g., fee profile 3, etc.

Step 218 may include processing the transactions between the payment facilitator and its submerchants using the assigned fee profiles. Step 218 may involve, for example, calculating the fees owed by the submerchants, payment facilitator, or the integration system, and deducting the fees in the transaction. Thus, if submerchant 1 were assigned fee profile 1, which prescribed that any deposit transaction would involve a 2.5% deduction, then a processing of the deposit transaction in step 218 may involve a deduction of 2.5% of the deposited amount.

Step 220 may include displaying transaction and other reports (e.g., secure scheduled reports (SSRs)). Furthermore, step 220 may involve displaying the results of a transaction (e.g., a display of account balances post transaction) on a user interface (e.g., payment facilitator portal or payment facilitator API). Step 220 may also be an optional feature available to the payment facilitator and other users upon request. In some embodiments, reports displayed by the integration system may provide details on the funds disbursed, details on the fees charged, details on any fund transfer failure, details on notice of change (NOC), Tax ID validation exceptions, IQ support, etc.

3. Dynamic Payout

In some embodiments, a dynamic payout, may involve prompting the payment facilitator to enlist submerchant clients (e.g., via the onboarding process). While transactions may proceed normally, funds from settled transactions may accumulate in a "for benefit of" (FBO), or "holding," account. In one embodiment, a payment facilitator may distribute the funds to the payment facilitator's submerchants by submitting a file containing instructions related to fund transfer via online transactions. The payment facilitator user may submit these instructions based upon the payment facilitator's agreements with the payment facilitator's submerchants periodically (e.g., daily, weekly, monthly, etc.). The integration system may process the instructions and may move the funds from the holding account to the submerchants. In some embodiments, funding can take place as early as the next day after settlement.

The dynamic payout funding method may also allow a payment facilitator to move funds to or from a payment facilitator user's reserve and/or operating accounts, as well as check writing services and other vendors involved in the money stream. A payment facilitator may also be able to move funds the same day, e.g., if the payment facilitator meets predetermined criteria.

The dynamic payout options may provide advantages over other funding methods described in the present disclosure. For example, a dynamic payout may facilitate or provide a solution platform that may control the distribution of funds using flexible, customized instructions defined by the payment facilitator. The solution may provide a closed-loop transaction life cycle from payment to payout. With one connection for payments and payout, the dynamic payout funding method may reduce a payment facilitator's dependency on other vendors, minimizing cost associated with PCI and reducing scope.

A dynamic payout may be dependent upon the payment facilitator submitting instructions each time a payout is required. A payment facilitator can fund merchants on a fixed schedule, e.g., daily, weekly, or monthly, or on an irregular schedule. Payment facilitators may even choose to delay funding based on contractual or risk related issues.

The dynamic payout may enable a user to execute payouts for various card brands, including American Express, Visa, Discover, etc., as early as the next day; determine when to pay out; calculate the fees to charge submerchants for rendering service (e.g., using a complex formula or tiered billing structure); charge fees at a transaction level, in addition to or as an alternative to the merchant identifier (MID) level; maintain a reserve on a payment facilitator's submerchants; and/or fund a submerchant that needs funds split across multiple bank accounts, e.g., by funding multiple bank accounts per submerchant.

FIG. 3 depicts a block diagram of general method 300 for dynamic payout funding, in accordance with a non-limiting embodiment.

It is contemplated that these steps may be performed by one or more processors of the integration system, but may be performed based on input by a payment facilitator user, via a user interface. Thus, a payment facilitator user may set up a dynamic payout funding solution using one or more of the followings steps of method 300. The integration system may also prompt the user to perform the steps, e.g., by leading the user through the process or through an instruction manual.

In some embodiments, step 302 may involve inputting identifying and financial information about the organization (e.g., of the payment facilitator) via the user interface. Information entered may include one or more of: the organization's ID, names of the organization, organization type and/or subtype, parent organization ID, exchange rate adjustment information, fee rounding preference, deposit credit limit, refund credit limit, orphan refund credit limit, a support MasterCard business service arrangement interchange rates, support query transactions, a sales force ID, a preference for logical back end typing enablement, a preference for starting multi-site day, and a maximum number of category nodes.

Step 304 may include adding presenters and/or secure file transfer protocol (SFTP) accounts for the payment facilitator. The presenters may include, for example, at least one for transaction processing and at least one for the merchant provisioner API. For each presenter, step 304 may further include entering presenter details (e.g., organization, presenter ID, name, presenter type, format code, transform, Auto RFR, a preference for returning a Card ID (CID) response, a maximum threads override, a maximum session transactions per second (TPS), a preference for enabling transaction, lookup tag, etc.). In some embodiments, steps 302 and 304 may also be performed for setting up managed payout, or payment facilitator-funded payout.

Step 306 may include creating a billing profile for the payment facilitator. This billing profile may include the payment facilitator's account fees charged by the payment facilitator, the integration system, and/or a third party. It is contemplated that third party accounts and/or billing profiles may also be created at this or subsequent steps. In some embodiments, the integration system may prompt the payment facilitator to provide a bank letter or voided check, e.g., electronically, to validate the payment facilitator's account.

The payment facilitator's account may be an operating bank account, and may be used for debiting fees, including chargebacks, interchange, and fees for running the integration system. In some embodiments, the billing profile may include, for example, the organization ID, the organization name, a billing profile ID, billing profile name, fee profile ID, fee profile name, a desired number of float days, a preference for bank closed fund transfer no delay, a settlement currency, a minimum transfer amount, an identification of an acquiring bank, and any card acceptor tax IDs to charge fixed acquirer network fees (FANF).

In some embodiments, step 306 may further include adding the authorization, settlement, and other fees to the billing profile. These other fees may include, for example, digital enablement fees (e.g., 0% for Visa and 0.1% for Mastercard), monthly maintenance fees, negative balance fees, "Know Your Customer" (KYC) scoring fees, and associated dynamic payout fees, etc.

In some embodiments, step 306 may further include adding a reserve account to the billing profile. The reserve account may be a for benefit of (FBO) account used by multiple payment facilitators, with a separate logical account within for each payment facilitator. The reserve account may be used by the payment facilitator to hold reserves on their submerchants, which may use and/or move funds from an FBO settlement account to the reserve account.

Step 308 may include creating a second billing profile. This second billing profile may be used for funding instructions by the payment facilitator or another merchant. Furthermore, the second billing profile may not be needed for direct funding. In some embodiments, the original billing profile may be copied and then updated to create the second billing profile that could be used for the funding instructions. For example, the seller identifications may be changed to distinguish from the original billing profile. Additionally, the second billing profile may be distinguished from the original billing profile, for example, by a change in the billing profile ID.

Step 310 may include creating processing groups. It is contemplated that for a payment facilitator funded payout, one processing group may be sufficient, unless there may be a mixture of conveyed/acquired, or value added services (VAS) that may involve additional processing groups. It is contemplated that for dynamic payout or managed payout funding methods, the user may be prompted to create two or more processing groups, e.g., at least one for transaction processing, and at least another for funding instructions. The processing groups may be named to accordingly distinguish their roles.

Step 312 may include adding submerchant information into a template merchant form. For example, step 312 may involve providing the user with a template merchant form and prompting the user to add submerchant information into the form. The integration system may use the template merchant form when provisioning new submerchants. The user may be prompted to complete the form using data collected from the merchant via an online payment facilitator analytic dashboard link and/or other third party platform. In some embodiments, the template form may be automatically populated using received data of the submerchant intended to be added.

Step 314 may include adding configurations for the payment facilitator. In some embodiments, the user may be prompted, e.g., via a user interface, to submit configurations for the payment facilitator. The payment facilitator configurations may include entries for payment facilitator ID, background checks on legal entity creation, submerchant funding, payment processing submerchant defaults, and chain code configuration status. In some embodiments, step 314 may involve subsequently prompting the user to complete the merchant template form after submitting configurations for the payment facilitator. In other embodiments, step 312 and 314 may be performed concurrently or in parallel.

For the payment facilitator configuration and/or the submerchant profiles, payment methods and details may be added. These payment methods may include card payments and eChecks. Furthermore, the user may be prompted to add any partner presenters. Furthermore, the integration system may prompt the user to add a billing descriptor as per a merchant identifier (MID) request. For example, a billing prefix may be used for each payment facilitator.

Step 316 may include creating a billing profile for a third party account. The third party account may be an FBO account that could be used for multiple payment facilitators with a separate logical account within for each payment facilitator. Thus, the third party account may actually be the FBO settlement account that distinguishes the dynamic payout method, as discussed above. The third party account may hold deposits minus refunds. In some embodiments, the integration system may auto-populate the billing profile with the account information.

In some embodiments, subsequent steps may be performed for added features of the dynamic payout options. For example, a presenter may be selected for a merchant provisioner. This may involve selecting a template presenter, and configuring the IQ fee per the contract.

In some embodiments, step 318 may include creating a funding instruction merchant. This step may involve verifying that if a partner is presenting funding instructions for the payment facilitator, that partner is connected to the funding instruction merchant. Subsequently, payment facilitator configuration may be re-activated, for example, to include configuring value-added services and features.

Creating/Registering Legal Entities and/or Submerchants

Figure 4:
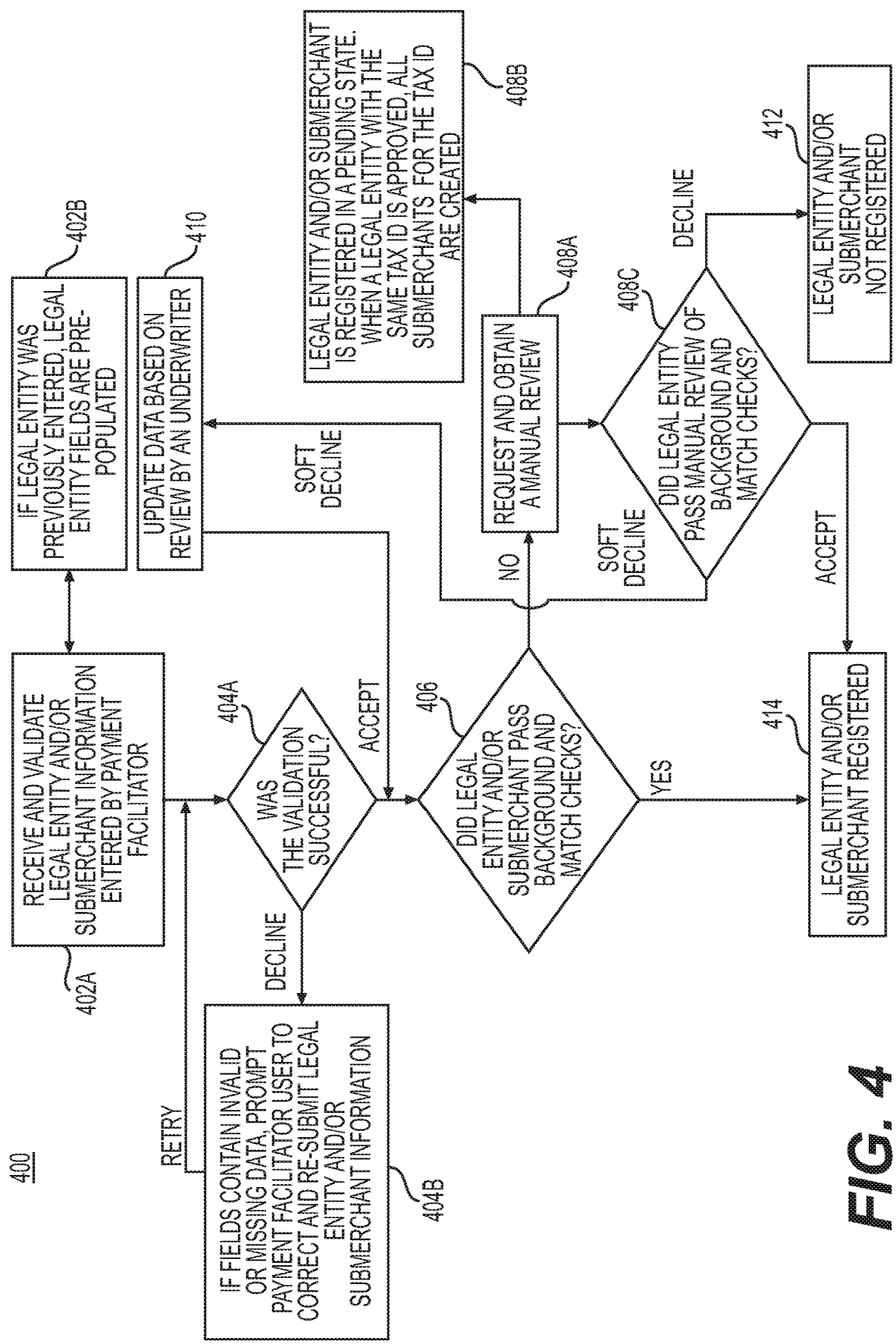
FIG. 4 depicts a block diagram of a general method of integrating legal entities and/or submerchants with a payment facilitator, in accordance with non-limiting embodiments.

FIG. 4 depicts a block diagram of general method 400 of integrating legal entities and/or submerchants with a payment facilitator, in accordance with non-limiting embodiments. In some embodiments, as shown in FIG. 400, the legal entities, submerchants, and the payment facilitator may be integrated by an onboarding process of the legal entities of the submerchants, which may involve background checks. It is contemplated submerchants may have legal entities that systems presented herein may reference in performing the onboarding process. Method 400 may be performed by an integration system based on input by a payment facilitator user via a user interface platform (e.g. payment facilitator portal, payment facilitator API, etc.)

At step 402A, the integration system may receive and validate legal entity and/or submerchant information entered by a payment facilitator user. Alternatively or additionally, if information pertaining to a legal entity (e.g., of the submerchant) and/or a submerchant was previously entered, the data fields for entering legal entity and/or submerchant information in the user interface platform may be pre-populated (e.g., as in step 402B). The previously entered information may have been stored and may be retrieved from memory. In some embodiments, a legal entity may describe the parent of one or more submerchants, or a representation of the submerchant itself. When a payment facilitator uses the payment facilitator portal or payment facilitator API to create a legal entity and/or a submerchant, the integration system may validate and perform a series of background checks. As can be seen in step 404A a validation may or may not be successful, depending on whether the legal entity fields were correctly or completely entered. For example, if the fields contain invalid or missing data (and therefore be the cause for an unsuccessful validation), step 404B may include prompting the payment facilitator user to correct and/or resubmit the legal entity and submerchant information (e.g., repeat step 404A).

If, subsequent to step 404A, the validation was successful step 406 may include determining whether the legal entity passes background and MATCH checks. The extent and type of check performed may depend upon a payment facilitator user's needs and/or contract. In some embodiments, there may be various levels or degrees of background checks that a user may select. For example, a higher degree of background check may involve performing KYC checks. In some embodiments, the result of a background check may include, for example, an acceptance, a decline, and/or a soft decline.

If, subsequent to step 406, the legal entity passes the background and MATCH checks, a submerchant may be enlisted and/or considered as onboarded by the integration system. Step 406 may involve providing an appropriate indication to a submerchant within a memory or a submerchant interface of the integration system. If, however, the legal entity does not pass the background and MATCH checks, step 408A may include requesting and obtaining a manual review (e.g., for the background and MATCH check). This step may assist to overcome problems caused by machine oversight or automation. For example, the manual review may be performed by an underwriter or personnel overseeing or facilitating the integration system over the course of one or more business days. In some embodiments, e.g., during a manual review, the enlisting or onboarding of the submerchant may be designated by the integration system as being in a pending state (e.g., 408B). In yet another embodiment, if a legal entity with the same Tax ID as the submerchant placed in the pending state is approved and/or onboarded, any submerchants of that tax ID (including the submerchant placed in the pending state) may be approved and/or onboarded (e.g., 408B).

Subsequent to step 408A, the integration system may determine, at step 408C, whether the legal entity passed the manual review of background and MATCH checks. Like at step 404A, the result of a background check may include, for example, an acceptance, a decline, and/or a soft decline. In one embodiment, a soft decline may be an opportunity to retry. Thus, if subsequent to step 408C, the integration determines that there is a soft decline based on the manual review, step 410 may include updating the data pertaining to the legal entity and/or submerchant based on the review from an underwriter or personnel. Subsequently, step 406 may be repeated. On the other hand, if the result of the manual review of the background and MATCH checks is a decline, then the submerchant may not be enlisted and/or onboarded (e.g., as in 412). In some embodiments, step 412 may involve not listing the submerchant as a successfully onboarded submerchant of a payment facilitator in the submerchant interface or memory.

If, subsequent to step 408C, the result of the manual review is an acceptance, the legal entity and/or submerchant may be considered as successfully enlisted and/or onboarded, e.g., as in step 414. In some embodiments, a successful enlisting and/or onboarding of a legal entity and/or submerchant may be referred to as registration. Furthermore, a registration of a legal entity and/or submerchant may involve an association with a payment facilitator, a successful validation, and a successful background check (e.g., resulting in an 'acceptance').

In some embodiments the operation of creating a new legal entity request may include prompting a user to enter information for a legal entity, the principal owner(s)/ officer(s) of the legal entity, and the first submerchant. Multiple principal owners may be entered, and the percentage stakes for each owner of the legal entity may be defined. In some embodiments, the integration system may be configured to ensure that the principal owners have a minimum percent stake in the legal entity (e.g., at least 25%). This information may be received by the integration system, e.g., via the payment facilitator portal user interface. Information regarding the first submerchant may include information related to its funding mechanism and/or payout method, e.g., standard funding or payment facilitator funded, managed payout, dynamic payout. In some embodiments, subsequent submerchants may also be added as such to the created legal entity (e.g., performing the operation of adding a submerchant). Once the integration system has entered the initial legal entity request, a user may be able to check the status for subsequent submerchant creation requests using the payment facilitator Search page, screen and/or site (e.g., by selecting the operation for searching for submerchants). In some embodiments, the integration system may display a confirmation message indicating that the legal entity was created. Alternatively or additionally, the integration system may display one or more of instructions to complete or correct missing or incorrect information (e.g., as in step 404B of FIG. 4), or a new submerchant ID number (e.g., if the legal entity was approved), or a message stating that the legal entity is in a non-approved state (e.g., as in step 408B in FIG. 4).

The operation of adding a submerchant may be used for adding the first submerchant in the operation of creating a new legal entity request, or for adding additional submerchants after the initial legal entity request was created and approved. In some embodiments, adding a submerchant may involve the integration system prompting the user the enter information for various data fields, as shown in FIG. 5B, and explained further below.

The background checks may include an instantaneous onboarding, a check by the Office of Foreign Assets Control (OFAC), a check by MATCH, card brand reports, Know Your Customer (KYC) information, and a validation of the submerchant by a risk analyst that may be set up by the integration system. In one embodiment, the result of a background check may result in the applicant being checked (e.g., legal entity, submerchant, payment facilitator) being placed in a watch list, e.g., of OFAC or MATCH. An applicant may be automatically queued to be manually reviewed under these conditions, or based on KYC scoring.

User Interfaces

Various embodiments of the present disclosure include a user interface for the integration of payment facilitators and submerchants. The user interface may be used by the payment facilitator. In some embodiments, a submerchant, legal entity, or an assigned third party (e.g., an underwriting analyst, bank, etc.) may be able to use at least some features or operations of the user interface.

Figure 5:
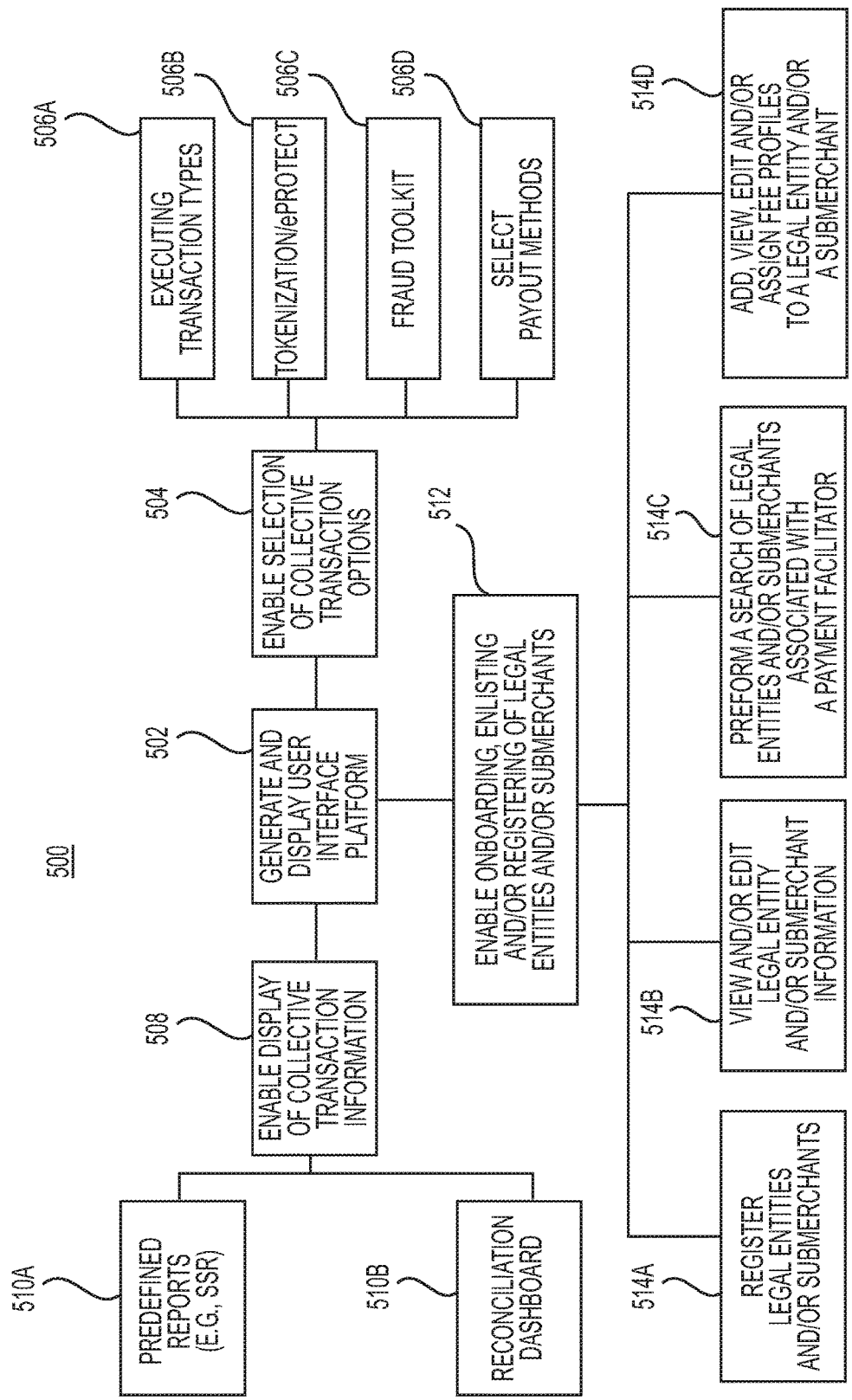
FIG. 5 depicts a block diagram of exemplary user interface functionalities, for automated integration between payment facilitators and submerchants, in accordance with non-limiting embodiments.

FIG. 5 depicts a block diagram of exemplary user interface functionalities for automated integration between payment facilitators and submerchants, in accordance with non-limiting embodiments. It is to be understood that the functionalities depicted in FIG. 5 are not exhaustive of the functionalities offered by the various exemplary user interface platforms (e.g., payment facilitator API, payment facilitator portal, etc.) described in the present disclosure, and nor does the various exemplary user interface platforms necessarily include each functionality depicted in FIG. 5. The user interface may be generated and displayed on a computing system or user device (e.g., tablet, phone, laptop, etc.).

Step 502 may include generating and displaying the user interface. The integration system and/or a server or computing system involved with the automated integration of payment facilitators and submerchants may host the application, program or site providing the user interface. In some embodiments, the user interface may be an application or program that is run by a processor (e.g., of the user device or computing system) and/or stored in the memory of the user device or computing system or in a non-transitory computer readable medium. It is contemplated that a memory, e.g., in the user device or computing system for the user interface, the non-transitory computer readable medium, or the integration system, may store instructions for generating and displaying the user interface.

As step 512 depicts, the user interface may enable a user (e.g., payment facilitator) to onboard, enlist, and/or register legal entities and/or submerchants. For example, the user interface may enable payment facilitator to input one or more of the following commands: register legal entities and/or submerchants (e.g., as in step 514A); view and/or edit legal entity and/or submerchant information (e.g., as in step 514B); perform a search of legal entities and/or submerchants associated with the payment facilitator (e.g., as in step 514C); and add, view, edit, and/or assign fee profiles to a legal entity and/or a submerchant (e.g., that is associated with the payment facilitator, e.g., as in step 514D).

In some embodiments, onboarding, enlisting, and/or registering a legal entity and/or submerchant associates the legal entity and/or submerchant with the payment facilitator, validates financial and identifying information pertaining to the legal entity and/or submerchant, and is based on an acceptance after a background check of the legal entity and/or submerchant. Method 400 as depicted in FIG. 4 describes at least one embodiment of the method for executing the command in step 514A in greater detail.

As will be described in further, details of a legal entity and/or submerchant may be edited and/or added (e.g., subsequent to step 514C) to incorporate information about a principal owner. FIG. 7A-7E depicts at least some embodiments of user interfaces executing the command in step 514C in greater detail.

The payment facilitator may also command, and the integration system and/or user interface may execute the command for a search of legal entities and/or submerchants associated with the payment facilitator, using a search criteria. In some embodiments, the search criteria may include, but are not limited to, a submerchant ID, an EIN/Tax ID, a registration/onboarding status, a legal entity name, a submerchant name, a request date range (e.g., the desired date range for the search), etc. FIG. 8 depicts at least one embodiment of the user interface implementing the command of step 514C in greater detail.

Likewise, FIG. 9A-9B depicts at least some embodiments of user interfaces executing the command in step 514D (e.g., add, view, edit, and/or assign fee profiles) in greater detail.

In some embodiments, the user interface, at step 504, may enable the user to select various collective transaction options (e.g., options for a plurality of transactions over a predetermined duration of time). For example, at step 506A, the user (e.g., payment facilitator) may input a command, and the user interface and/or integration system may execute the command for one or more transactions. The types of transactions may include, but are not limited to an authorization transaction, a partial capture transaction, an "AVS Only" transaction, an authorization reversal, a capture transaction, a capture given authorization transaction, a credit transaction, a sale transaction, a void transaction, etc. At least some embodiments for these transaction types may be described in further detail below.

Collective transaction options, that a user may input a command for, and the integration system and/or user interface may execute, may further include a tokenization/eProtect option 506B, implementing various tools and/or filters for fraud prevention (e.g., fraud toolkit 506C), and a selection of payout methods 506D (e.g., payment facilitator funded payout, managed payout, dynamic payout, etc.). A tokenization or an implementation of the eProtect API for transaction information may encrypt or encode specific transaction information, e.g., to protect private or sensitive information.

In some embodiments, the user interface may enable a user to view, by displaying, collective transaction information (e.g., as in step 508). As will be described further in the present disclosure, various aspects of collective transaction information may be displayed as predefined reports (e.g., secure standardized reports (SSRs)) 510A, and on a reconciliation dashboard 510B that may display, for example, settlements and account summaries for one or more submerchants or the payment facilitator.

User interface platforms may include payment facilitator API or a payment facilitator portal, as described further below.

1. Payment Facilitator API

The payment facilitator API may be an XML based, RESTful API that may allow a payment facilitator to create and update legal entities and submerchants, and retrieve information about existing legal entities and submerchants in near real-time. Additionally, a payment facilitator may be able to disable submerchants should the need arise.

A payment facilitator may use various methods to create, retrieve, update, or disable submerchants, as well as list Merchant Category Codes (MCC). The associated data may be submitted in various XML messages. For example, using the payment facilitator API, a payment facilitator user may perform one or more of the following functions: (1) request to create a new legal entity, (2) request to update data associated with the designated legal entity, (3) request for information and/or status of the designated legal entity, e.g., to check status of a legal entity in manual review, (4) request to update data associated with the principal, (5) request to create a submerchant associated with the designated legal entity, (6) request to update data associated with the designated submerchant, (7) request to retrieve information about the designated submerchant, and/or (8) return a list of merchant category codes that are currently approved for the payment facilitator.

2. Payment Facilitator Portal

The payment facilitator Merchant On-boarding Portal is a user interface based on a reporting and analytics framework, and on the payment facilitator API, which may allow payment facilitators to easily add, edit, view, and search for legal entities, and submerchants. The payment facilitator portal may allow a payment facilitator to create submerchants easily on a one-by-one basis.

A payment facilitator can enter information for a new legal entity, principal, and submerchant from a single screen. Once a legal entity is approved, entering additional submerchants may be simplified, as the legal entity fields may become pre-populated with the previously-entered data.

In one embodiment, the payment facilitator portal may provide one or more of the following screens and operations: (1) adding and editing a submerchant, (2) searching for and viewing submerchants, (3) disabling a submerchant, and (4) exporting an Excel spreadsheet containing complete information on submerchants based on a payment facilitator's search criteria.

Payment Facilitator Portal Operations

FIGS. 6A-6D depict exemplary screenshots of a user interface platform for a system of automated integration and payout funding between payment facilitators and submerchants, displaying an overview of a user interface platform, in accordance with non-limiting embodiments. At least one embodiment of a user interface platform for performing various operations described in the present disclosure involves the "payment facilitator portal," as shown in FIGS. 6A-6D.

In some embodiments, the payment facilitator portal may provide several pages, screens, and/or sites designated for, adding a submerchant ("add-submerchant" 640), viewing a submerchant ("view submerchant" 650), conducting or viewing the results of a payment facilitator search ("payment facilitator Search" 660), setting up or viewing a fee profile ("fee profile" 670), etc. Various operations may be available at each of these pages, screens, and/or sites for a user to select, on a user interface platform.

Figure 6A:
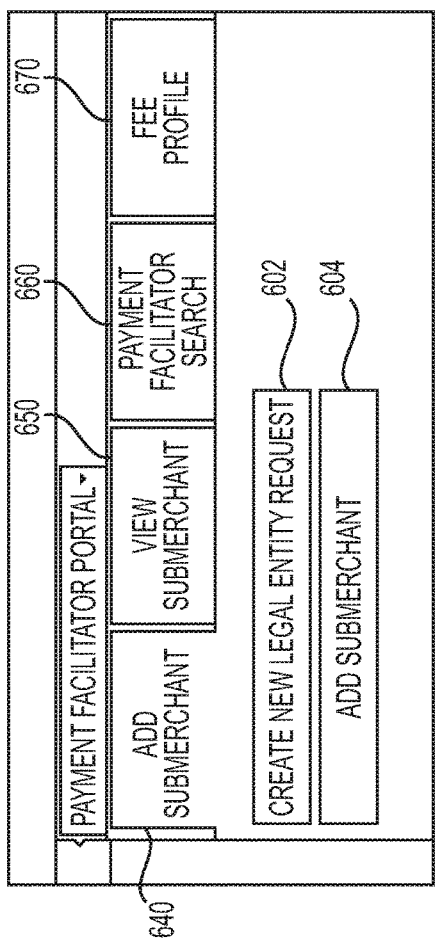
FIGS. 6A-6D depict exemplary screenshots of a user interface for a system of automated integration and payout funding between payment facilitators and submerchants, displaying an overview of a user interface platform, in accordance with non-limiting embodiments.
Figure 6B:
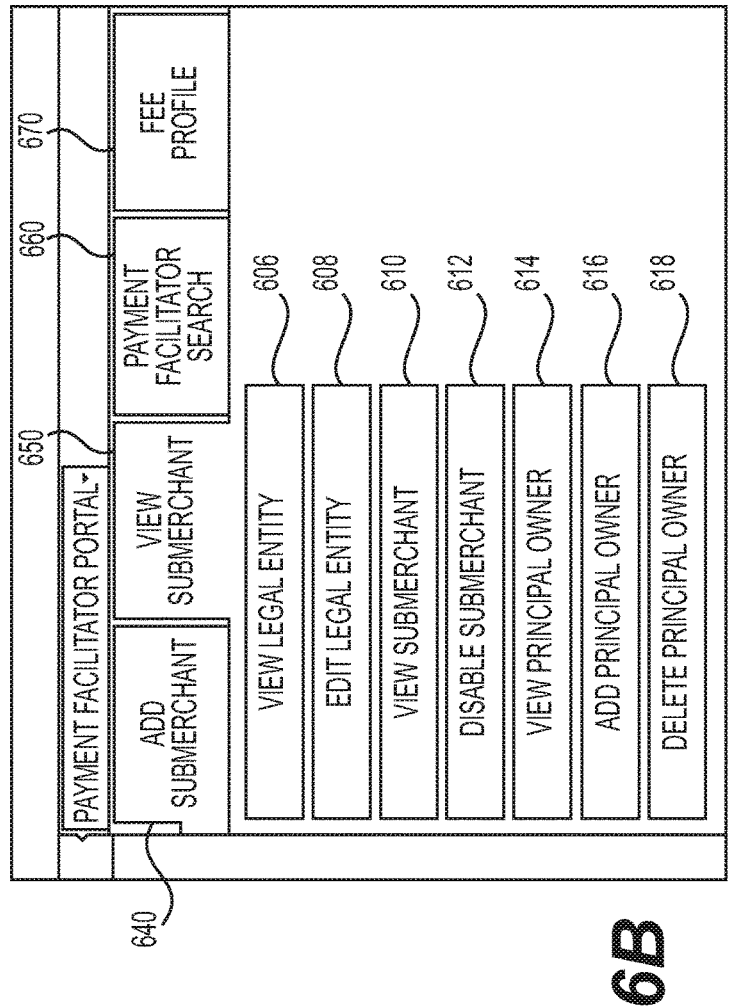
Figure 6C:
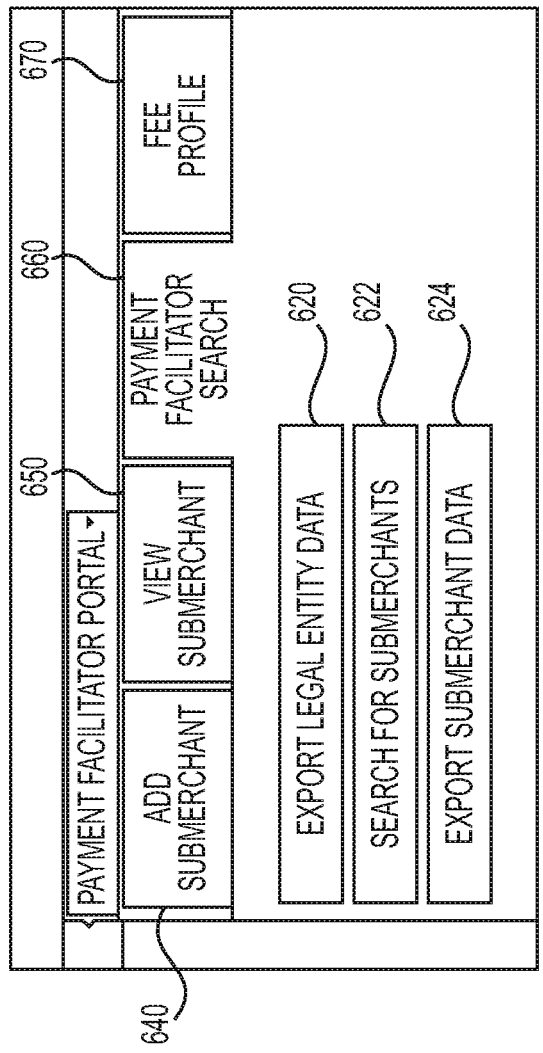
Figure 6D:
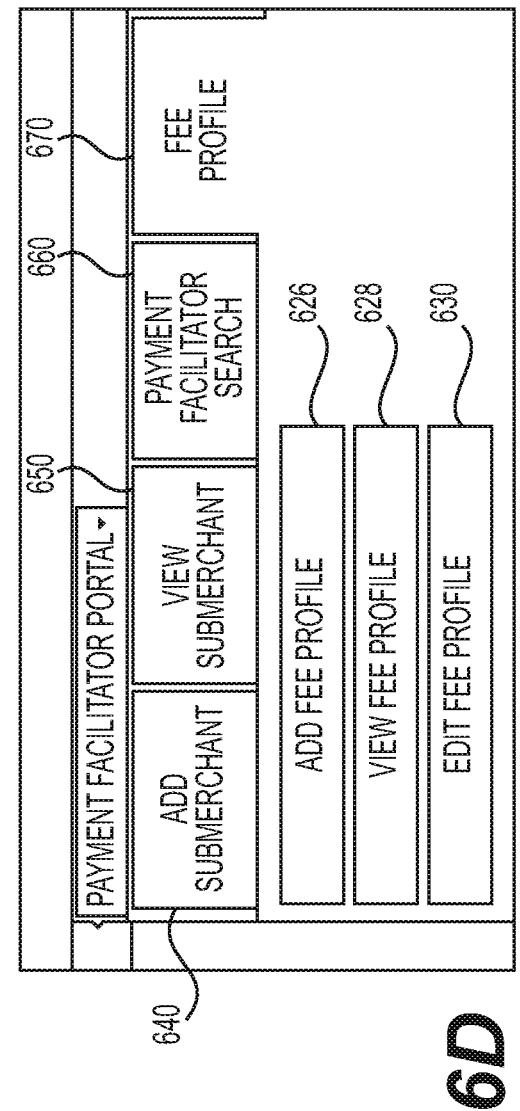

For example, as shown in FIG. 6A, a user may be able to perform the operations of creating a new legal entity request 602 or adding a submerchant 604 at the add submerchant 640 page, screen, and/or site. As shown in FIG. 6B, a user may be able to perform the operations of viewing a legal entity 606, editing a legal entity 608, viewing a submerchant 610, disabling a submerchant 612, viewing a principal owner 614, adding principal owner(s) 616, deleting a principal owner 618, etc. at the view submerchant 650 page, screen, and/or site. FIG. 6C is a screenshot of the user interface where a user may be able to perform the operations of exporting legal entity data 620, searching for submerchant(s) 622, and exporting submerchant data 624 at the payment facilitator search 660 page, screen, and/or site. Furthermore, a user may be able to perform the operations of adding a fee profile 626, viewing fee profile(s) 628, and editing a fee profile 630 at the fee profile 670 page, screen, and/or site, as shown in FIG. 6D. It is contemplated that other embodiments may include alternate or additional configurations of pages, screens, and/or sites with an alternate or additional sets of operations.

FIGS. 7A-7E, 8, and 9A-9B depict exemplary screenshots of a user interface platform for a system of automated integration and payout funding between payment facilitators and submerchants, displaying exemplary data fields for adding and viewing submerchants, payment facilitator searches, and fee profiles, in accordance with non-limiting embodiments.

For example FIGS. 7A-7E display functionalities for entering information, e.g., if a user selects a page, screen, and/or site for adding submerchants and/or viewing submerchants (e.g., marker 640 and 650 in FIGS. 6A-6D), FIG. 8 displays functionalities for entering information, e.g., if a user selects a page, screen, and/or site for payment facilitator searches (e.g., marker 660 in FIGS. 6A-6D), and FIGS. 9A-9B display functionalities for entering information if a user selects a page, screen, and/or site for fee profiles (e.g., marker 670 in FIGS. 6A-6D).

Figure 7A:
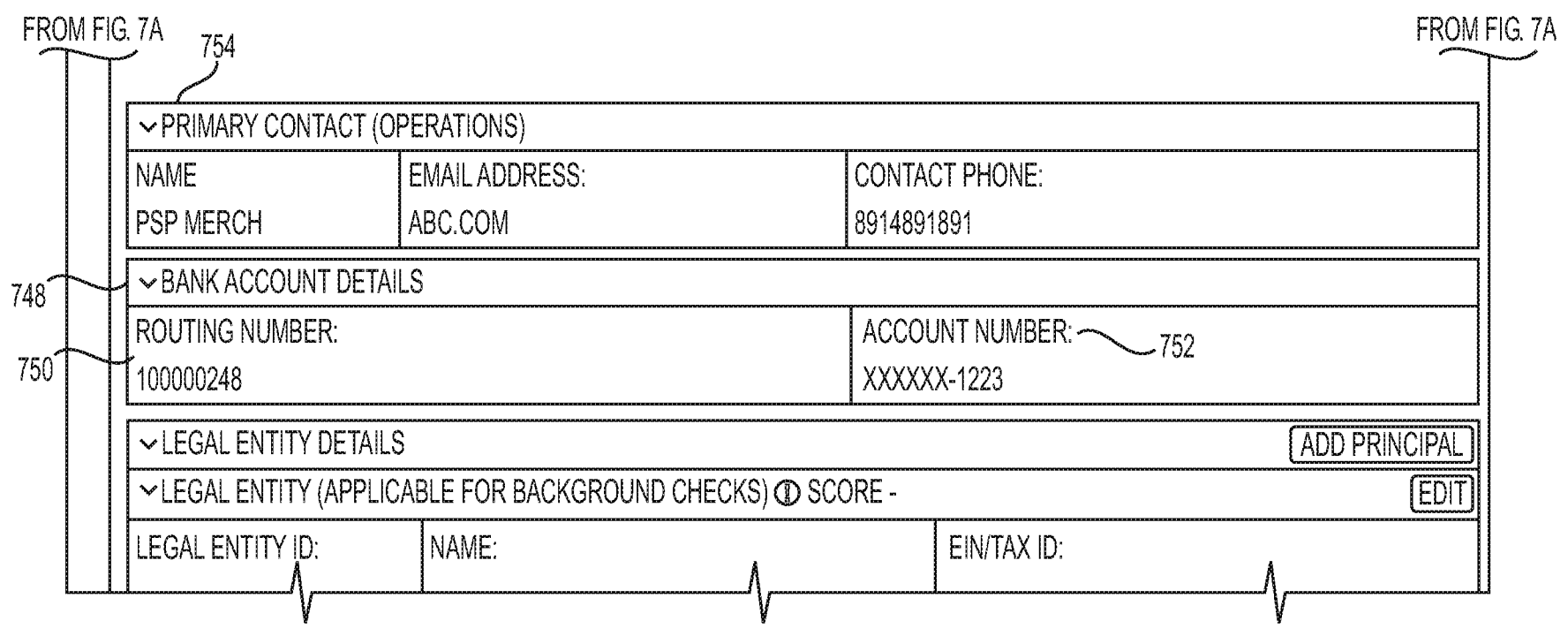

As shown in FIG. 7A, data fields for at least one page, screen, and/or site of the user interface platform (e.g., in the viewing submerchants and/or adding submerchants tab) may include one or more of: a summary 702 (e.g., submerchant ID 704, request date 706, underwriting analyst decision date 708, last modified date 710, background check status 712, processing status 714, a connectivity credential 716, a pay page credential 718, etc.) payment processing configuration information 720 (e.g., payment facilitator's submerchant ID 722, merchant name 724, merchant category code (MCC) 726, tax authority information 728, a billing descriptor prefix and/or default billing descriptor prefix 732, customer service phone contact 734, URL 736, payment network information 738 (e.g., an indication of whether the submerchant has been acquired by American Express, American Express merchant ID, American Express seller ID, Discover merchant ID), settlement currency 792 used by the submerchant, purchase currency 794 of the submerchant, an indication of whether the submerchant is enabled for fraud filters, an indication of whether the submerchant is enabled for eCheck transactions 795, an indication of whether the submerchant is funding enabled (e.g., managed payout or dynamic payout) 796, fee profile ID 740, a maximum transaction amount allowed for the submerchant 742, address of the submerchant 744, an indication of whether the submerchant has created connectivity credentials 746, bank account details 748 (e.g., routing number 750, account number 752, etc.); and/or primary contact information 754.

In some embodiments, as shown in FIG. 7B, the data fields may further include legal entity information 756 (e.g., EIN/Tax ID 758, name of legal entity 760, business and/or ownership type 762, legal entity ID 764, doing business as identity 766, contact phone 768, address 770, IRS tax ID validation status 772, years in business 774, etc.). The user interface, for example, on this this panel, may also provide the functionality for adding a principal.

As shown in FIG. 7C, a user may also enter data fields for legal entity background check results, e.g., using the viewing submerchants and/or adding submerchants page, screen, and/or site (e.g., e.g., as in markers 640 and 650 in FIGS. 6A-6D). These data fields may include, for example, underwriting analyst notes 776 (e.g., for use in performing step 410 of method 400, as depicted in FIG. 4); a name and address of a tax ID association 778; a name and address of a phone association 780; a business & principal relationship 782; potential risk indicators 784; a recent bankruptcy filing 786 (e.g., if available); a recent judgment/lien finding (e.g., if available) 788, etc. In some embodiments, the user interface may also display and/or provide access to a list of various legal entity agreements that the legal entity may be involved in. For example, a legal entity agreements panel may display operating agreements currently in place that may have been accepted by submerchants during the sign-up or onboarding process.

FIG. 7D depicts exemplary data fields for entering principal owner information, including identifying information 790 (e.g., name, title, SSN, date of birth, email address, contact phone, driver's license information, address, etc.) and stake percent 792. Like FIG. 7C, which depicts exemplary data fields for legal entity background check results, similar data fields can be found for principal owner background check results 799, as depicted in FIG. 7E.

Thus, pages, screens, or sites pertaining to the legal entity, principal owner, and/or background checks, as described above, may provide information and results of the background check for the principal owner/officer, and/or a score assigned to the principal or the business-to-principal association. Furthermore, these panels may display a score and/or summary of the level of identity verification, as indicated by the background check performed. The panels may also indicate to the user if a Tax ID validation fails. In such situations, the integration system may prompt the user to resubmit the submerchant request when certain Tax ID validation errors occur, depending upon the stage of approval. In some cases, a new background check may be initiated. Furthermore, the payment facilitator portal may allow a user to view the payment facilitator Tax Id Validation Report, via the scheduled secure report (SSR) service, as will be described further in the present disclosure, to determine if a legal entity tax ID validation may have failed.

The PayPortal or other user interface platform may also provide a payment facilitator Search function (e.g., as shown in FIG. 8), from which a user may select to perform the operation of searching for submerchants. The operation may prompt the user to enter search criteria 802 and then select a submerchant from the results 804 to view. The user can also export merchant data, such as a spreadsheet, (e.g., using icon 806) from the payment facilitator search results containing complete information about each of the submerchants listed in your search results. The search criteria may include, but are not limited to, a submerchant ID 808, an EIN/Tax ID 810, a status 812 (e.g., an approval status of a legal entity and/or submerchant, the approval status including, but not limited to: approved, manual review, try, declined, validation error, internal error, etc.), a legal entity name 814, a submerchant name 816, a request date range 818 (e.g., the desired date range for the search), etc.

The user interface platform (e.g., payment facilitator portal) may provide a page, screen, or site 900 for setting up, editing or viewing submerchant fee profiles (e.g., as shown in FIGS. 9A-9B), which may be used by a user to configure how to charge submerchants for transactions (e.g., by method of payment, by transaction type, a flat fee versus a percentage fee, etc.) in order to facilitate submerchant Funding. The user may create custom fee profiles using the payment facilitator portal, then assign a fee profile to each submerchant.

After associating a fee profile with a submerchant, the submerchant may start processing transactions. The integration system may calculate fees that the submerchant may owe a payment facilitator user and may disperse the funds to the payment facilitator user and the submerchant accordingly. This may enable the payment facilitator user to fund submerchants as early as the next day, and may help avoid the need to establish a banking relationship, separate integrations, and a complex billing engine.

FIG. 9A depicts an exemplary screenshot of the names 902 of various fee profiles that were created and the number 904 of submerchants that have been assigned to it. A payment facilitator user can configure a fee profile to include fees for approved and declined transactions for various payment networks and methods (e.g., Visa, MasterCard, Discover acquired, American Express acquired, eChecks, etc.). As shown in FIG. 9B, the fees for approved transactions may include, but are not limited to, deposits 906 (e.g., flat rate and/or a percent rate for each method of payment), chargebacks 908 (e.g., flat rate for first chargebacks and refund chargebacks for each credit card payment type, flat rate for eCheck returns, etc.), refunds 910 (e.g., flat rate for each method of payment). Fees for approved transactions may additionally include but are not limited to authorizations (e.g., flat rate for authorizations and authorization reversals for each method of payment), etc. Furthermore, fees for declined transactions may include, but are not limited to deposits (e.g., flat rate and/or a percent rate for each method of payment), refunds (e.g., flat rate for each method of payment), and authorizations (e.g., flat rate for authorizations and authorization reversals for each method of payment). In some embodiments, the page, screen, or site for the submerchant fee profiles of the payment facilitator portal may list fee profiles that were previously created, along with the number of submerchants associated with each profile.

Furthermore, the payment facilitator portal may enable a user to add, view, and/or edit a submerchant fee profile. In one embodiment, adding a fee profile may include prompting the user to enter a unique identifier for the fee profile, and enter desired amounts for any fees for approved transactions or declined transactions.

The user interfaces for integrating payment facilitators and submerchants, e.g., payment facilitator API and payment facilitator portal, may include various functionalities for payment facilitator users to facilitate transactions. These functionalities may include a selection and performance of core transaction types.

The core transaction types may include, for example, an authorization transaction, a partial capture transaction, an "AVS Only" transaction, an authorization reversal, a capture transaction, a capture given authorization transaction, a credit transaction, a sale transaction, a void transaction, etc.

For example, the authorization transaction may enable a payment facilitator to confirm that a customer has submitted a valid payment method with their order and has sufficient funds to purchase the goods or services they ordered.

An approved authorization may reduce the customer's credit limit (or bank balance, in the case of a debit card) by the amount of the approval by placing the amount on hold.

While it is contemplated that most merchants would perform authorizations as online transactions, they need not do so.

The lifespan of an authorization may depend upon the payment method. For example, authorization lifespans for MasterCard, Visa, or American Express may be seven years, whereas a lifespan for Discover may be 10 years.

In some embodiments, as long as the authorization has not expired, or the amount exhausted, a payment facilitator can use the authorization transaction functionality repeatedly to fulfill an order. This may be the case if the authorization covered multiple items with staggered deliveries. In this scenario, a payment facilitator may issue a partial capture transaction as each item shipped until the order was completely fulfilled.

An "AVS Only" transaction may be a variation of an authorization transaction that may use the address verification system (AVS) to enable a payment facilitator to verify that a customer's supplied address matches the billing address associated with the card.

One use of an authorization reversal transactions may be to eliminate unused amounts on an unexpired authorization and thus avoid misuse of authorization fees imposed by the card networks. Issuing an authorization reversal may also provide the benefit of freeing remaining held amounts that may otherwise reduce the buying power of a payment facilitator's customer. Potentially, this may increase customer satisfaction and can allow a customer to proceed with additional purchases that may otherwise be blocked by credit limits. For American Express transactions, the reversal amount may match the authorization amount. Some embodiments of the system may not allow the partial reversals and reversals against remaining amount after a partial capture.

Another advantage of authorization reversal transactions may occur on Visa transactions. Typically, for payment facilitator users to qualify for the best possible interchange rates from Visa, the amount of the capture may need to match the amount of the associated authorization. In order to take advantage of this situation for a payment facilitator user, if the capture amount is less than the associated authorization amount, the integration system may automatically perform a partial authorization reversal for the unused amount.

A payment facilitator may use a capture transaction, often referred to as a deposit, to transfer previously authorized funds from the customer account to a payment facilitator's account after order fulfillment.

For example, for a Visa transaction, if a payment facilitator submits a capture for an amount less than the authorized amount, the integration system may automatically issue a partial authorization reversal for the balance of the authorized amount.

Similar to a capture transaction, a payment facilitator may use a capture given authorization transaction to transfer previously authorized funds from the customer to a payment facilitator after fulfillment. It is contemplated that a payment facilitator may use a capture given authorization transaction if the associated authorization occurred outside of the integration system (e.g., if a payment facilitator received a telephone authorization).

When a payment facilitator submits a capture given authorization transaction, the integration system may attempt to match it to an existing authorization using COMAAR data (card number, order ID, merchant ID, amount, approval code, and authorization response date), e.g., to obtain a better interchange rate for the transaction. In some embodiments, this feature may use the following matching logic: if the order ID was either not submitted (blank, spaces, or null) or does not match any authorization in the system, the order ID may be ignored and the matching attempt may proceed using the remaining COMAAR data; if the matching operation results in multiple possible matches, the application may select the authorization with the lowest amount that is greater than or equal to the capture given authorization amount. Some embodiments of the integration system may require that the authorization amount be greater than or equal to the capture given authorization amount. Furthermore, the application may further narrow the match candidates to the one with the most recent response date.

In some embodiments, if the integration system may be able to match the capture given authorization to an authorization, for example, the card type may be Visa and the capture given authorization amount may be less than the authorization amount, then the integration system may issue an authorization reversal transaction for the balance of the authorization. This may be done to obtain the best possible interchange rates from Visa.

A payment facilitator may use a credit transaction (or "refund") to return money to a customer, even if the original transaction may have occurred outside of the integration system. For example, a payment facilitator can submit refunds against one or more of a capture transaction, a capture given authorization transaction, a sale transaction, and/or an external sale or capture.

A sale transaction may enable a payment facilitator to authorize fund availability and/or deposit those funds by means of a single transaction. The sale transaction may also be known as a conditional deposit, because the deposit may take place if the authorization succeeds. In some embodiments, if the authorization is declined, the deposit may not be processed.

If the authorization succeeds, the deposit may be processed automatically, regardless of the AVS or CVV2 response.

The void transaction may enable a payment facilitator to cancel a settlement transaction, e.g., if the transaction has not yet settled and/or if the original transaction occurred within the integration system.

The user interfaces may also include functionalities for enhanced core transactions. For example, when a consumer has insufficient funds available for a purchase, whether due to a credit limit, use of a gift card, or other reason, a payment facilitator can use a partial authorization to gain an approval for a portion of the funds, thereby adding to revenue by reducing declines caused by insufficient funds. This may allow a payment facilitator to request a secondary payment method from the consumer, or in some cases, a payment facilitator may wish to settle for the reduced amount to extend the lifetime value of the customer.

Although the integration system platform may be optimized especially for card-not-present transactions, it is contemplated that the system may be able to support card present transactions as well. This may include transactions initiated via point of sale (POS) devices, as well as cardholder activated terminal (CAT) devices. When submitting a POS transaction, in addition to submitting the track data from the card, a payment facilitator may also include the POS element and/or its child elements.

Alternate Methods of Payment

Alternate payment methods (other than credit/debit cards) may be supported by the integration system (e.g., via an eCommerce platform in the integration system). The alternate payment methods may include, for example, eCheck transactions, and gift cards.

An eCheck may be an alternative payment method that may directly debit a consumer's account via an automatic clearing house (ACH) network. From a payment facilitator's standpoint, offering eCheck as a payment method may provide several advantages, including a large consumer base in excess of 130 million accounts and no interchange fees.

Automatic Notice of Change (NoC) Updates

Similar to an issuing bank providing credit card account updater information, receiving depository financial institutions (RDFIs) may provide notification of change (NoC) files and may deliver them through the ACH network. These NoC files may include updated account information including, but not limited to, bank routing numbers, account numbers, and account names.

The integration system may make the NoC information available to a payment facilitator for a payment facilitator's use in updating a payment facilitator's customer files. Additionally, if a payment facilitator submits a transaction containing information that has changed, the integration system may automatically update the information and may forward the corrected transaction to the ACH network. The card-not-present API response message to the payment facilitator may also include the updated information for the payment facilitator's use in correcting the payment facilitator's database.

Rules set by the National Automated Clearing House Association (NACHA) may permit merchants to redeposit entries when an initial deposit was returned, e.g., for insufficient funds or uncollected funds. For example, a maximum redeposit attempts (e.g., two) may be set within a prescribed time (e.g., 180 days) of the settlement date of the initial deposit. The integration system may offer an optional service that may allow a payment facilitator to preconfigure automatic redeposits of transactions returned for those reasons. A payment facilitator may define the number of days from the initial return for the integration system to resubmit the transaction. A payment facilitator may also define the number of days from the return of the first resubmission for the attempt of a second resubmission.

A payment facilitator may track the current state of a payment facilitator's transactions, returns, and resubmissions via user interfaces provided by the integration system (e.g., payment facilitator portal, payment facilitator API, analytic dashboard, etc.).

For example, consider a payment facilitator submitted an eCheck sale transaction on January $29^{th}$ that is returned for Return Reason Code R01—Insufficient Funds. The return may occur on February 1. With the auto redeposit feature enabled and a preset period of 5 days for the first redeposit, the integration system may automatically generate a resubmission of the deposit on February $6^{th}$. If this transaction is also returned for the same reason on February $7^{th}$ and a payment facilitator have a preset time period for the second redeposit on 7 days, the integration system may generate the second redeposit on February 14.

In some embodiments, eCheck specific transaction types may include, but are not limited to eCheck credit, eCheck redeposit. eCheck sales, and eCheck void. A payment facilitator may use an eCheck credit transaction to refund money to a customer, when the method of payment was an eCheck. A payment facilitator can submit an eCheck credit transaction regardless of whether the original transaction occurred in or out of the integration system.

An eCheck redeposit may be used to manually attempt redeposits of eChecks returned for either insufficient funds or uncollected funds. A payment facilitator can use this element in online or batch transactions. In some embodiments, if a payment facilitator has enabled the auto redeposit feature, the integration system may reject an eCheck redeposit transaction that the payment facilitator submits.

An eCheck sale may be used to transfer funds from the customer to a payment facilitator after order fulfillment. It is the eCheck equivalent of a capture transaction. Funding may usually occur within two days. A payment facilitator can also submit this transaction type as a conditional capture, which may render processing of the deposit conditional upon a successful verification. If the verification fails, the deposit may not be processed.

An eCheck void transaction may be used to halt automatic redeposit attempts of eChecks returned for insufficient funds or uncollected funds, or cancel an eCheck sale transaction, as long as the transaction has not yet settled. This may also apply to payment facilitator initiated redeposits.

The integration system platform may allow the processing of a gift card. The user interface of the integration system may enable the payment facilitator user (via functionalities or buttons that the payment facilitator user may input) to submit various transaction types, including, but not limited to, activating a transaction, activating a reversal, a balance inquiry, deactivating a transaction, deactivating a reversal of a transaction, depositing a reversal transaction, loading a transaction, loading a reversal of a transaction, refunding a reversal transaction, unloading a transaction, unloading a reversal transaction, etc.

A payment facilitator user may use a functionality (e.g., button, link, etc.) for activating a transaction to change the status of a gift card from an inactive to an active state and having an amount value. A payment facilitator may also use this transaction type to create a virtual gift card.

A payment facilitator user may use an activate reversal transaction functionality to change the status of a newly activated gift card from active to inactive, thus reversing the operation of an active transaction. The activate reversal transaction functionality may reference the associated activate transaction functionality.

A payment facilitator user may use a functionality for a balance inquiry to determine the balance available for use on a gift card.

A payment facilitator user may use a functionality to deactivate a transaction to change the status of a gift card from an active to an inactive state.

A payment facilitator user may use a functionality to deactivate a reversal transaction to change the status of a newly deactivated gift card from inactive to active, thus reversing the operation of the functionality to deactivate the transaction. Thus, the deactivate reversal functionality may reference the associated deactivate transaction functionality.

Furthermore, a payment facilitator user may use a functionality to deposit a reversal transaction to reverse a funds capture that may have been initiated, e.g., by a capture or sale transaction functionality. Thus, the deposit reversal functionality may reference the associated capture/sale transaction functionality.

A payment facilitator may use a functionality to load a transaction to add funds to an active gift card. In some embodiments, the integration system may be configured so that the load amount does not exceed the maximum allowed amount for a gift card. In such embodiments, if the payment facilitator user attempts to load more than the maximum amount, the transaction may be declined, and the user interface may indicate the cause of decline as the desired load amount exceeding the maximum allowed amount.

A payment facilitator user may use a functionality to load a reversal to reverse the operation of the load transaction operation, removing the newly loaded amount from the gift card. In one embodiment, this transaction functionality may reverse the full amount of the referenced operation of loading a transaction.

The operation for refunding a reversal transaction may be used to reverse the operation of a refund transaction on the gift card. In one embodiment, this transaction functionality may reverse the full amount of the referenced refund transaction.

A payment facilitator user may use a functionality to unload a transaction to remove funds from an active gift card. The unloaded amount cannot exceed the available balance on the gift card. In one embodiment, if a payment facilitator user attempts to unload more than the available balance, the transaction may be declined, and the user interface may indicate the cause of the decline, e.g., an invalid amount.

The operation of unloading a reversal transaction may be used to reverse the operation of the operation of unloading a transaction, returning the value removed from the gift card by the operation to unload transaction.

Value Added Services

In some embodiments, the integration system or platform may provide value added services (VAS), which a user may be able to access, input, and/or code in to implement on a payment facilitator API or payment facilitator portal user interface. Thus, a payment facilitator user may use the VAS features, e.g., by coding to additional transaction types, adding additional data elements to transaction submissions, and/or coding to parse additional information returned in the response messages. VAS features may include, but are not limited to, tokenization and eProtect, and a fraud toolkit.

1. Tokenization and eProtect

In various embodiments, tokenization may refer to a process by which a credit card number or eCheck account number may be replaced by a reference number (e.g., a "token"). Unlike the card or account number, a payment facilitator can store the token on a payment facilitator's system, potentially allaying concerns of security breach exposing critical customer information. The integration system may store the information in a secure manner, such as in a virtual vault. Furthermore, the integration system may restrict access to it to when a payment facilitator submits a transaction using the supplied token. In one embodiment, the eCheck tokenization feature may be used if the payment facilitator is enabled for card tokenization. In the case of credit cards, since a payment facilitator may not store the customer's account information, the scope of PCI requirements to which a payment facilitator must comply may be minimized. This may reduce the cost of compliance and may limit a payment facilitator's liability if a payment facilitator's systems are breached. A payment facilitator may further reduce the requirements, as well as the possibility of exposure from a breach through the use of the eProtect feature. By sending the card information from a payment facilitator's page directly to the integration system, a payment facilitator may eliminate one more facet of handling the card information.

For credit cards, in an effort to minimize development requirements on the payment facilitator side, the integration system may use a format-preserving tokenization scheme. For example, the length of the original card number may be reflected in the token, so a submitted 16-digit number may result in a 16-digit token. Tokens may use numeric characters, so that a payment facilitator may not need to change its systems to accept alpha-numeric characters.

The credit card token numbers may have two parts. The last four digits may match the last four digits of the card number. The remaining digits (length can vary based upon original card number length) may be randomly generated. Unlike some credit card numbers, which may be Mod 10 compliant, tokens may be Mod 10+1 compliant.

For an eCheck token, since the account number length can vary widely, the integration system may make the tokens a uniform length, e.g., of 17 digits. Unlike some card tokens, the eCheck token number may be randomly generated. In some embodiments, the system may supply the last three characters of an account number in a separate element. As with some credit card tokens, eCheck tokens may be Mod 10+1 compliant.

A payment facilitator may obtain tokens for an account number in various methods known to those having ordinary skill in the art. For example, a payment facilitator can submit an existing card number/eCheck account information (e.g., account number and routing number) using a transaction functionality to register a token ("Register Token Request") request. When the integration system receives this input, the integration system may generate a token and return it to the payment facilitator, e.g., via a "Register Token response" functionality. Although a payment facilitator can use this method to tokenize an account number at any time, it may be most useful when initially tokenizing a payment facilitator's customer database.

In one embodiment for obtaining a token, a payment facilitator user may submit a supported transaction with the card information. If a payment facilitator is a tokenized payment facilitator, the integration system may automatically convert the submitted card number to a token and return it to the payment facilitator in the transaction response. Typically, a payment facilitator may use this method when taking and submitting a transaction during the normal course of business. When the payment facilitator receives the response, the payment facilitator may store the token instead of the card information. It is contemplated that once a card number has been converted to a token for a particular payment facilitator, subsequent submissions of the same card number may return the same token.

In another embodiment for obtaining a token, the integration system may issue a registration ID. A payment facilitator may then submit the Registration ID in an authorization or sale transaction and may receive the token in the response message.

2. Fraud Toolkit

Just because a credit card network/company returns a valid authorization for a purchase may not necessarily mean that completing the transaction is in a payment facilitator's best interest. There are multiple reasons a payment facilitator user may wish to decline a sale on a particular card at a particular time. For example, a transaction may be fraudulent. Acting to stop these transactions at submission may prevent loss, and/or may reduce the number of fraud related chargebacks in the future. Some embodiments of the integration system may offer a robust fraud solution, e.g., the "Fraud Toolkit," to assist a payment facilitator user in reducing the number of possibly fraudulent transactions inflicted upon a payment facilitator by bad actors.

Tools provided may include, one or more of: AVS Filter; CVV No-Match Filter; International BIN Filter; Prepaid Non-Reloadable Filter; Prior Chargeback Filter; Prior Fraud Advice Filter; Card Velocity Filter; Email Velocity Filter; Phone Velocity Filter; IP Velocity Filter; Device Velocity Filter; IP Address, Geolocation, and Proxy Detection; Merchant Customizable Rules Template; ThreatMetrix Cybercrime Dashboard; (Asynch) Transaction Review Queues; Rule Management and Portal Training; Standalone Transaction API Access; Cybercrime Industry Report (Quarterly); and Access to Fraud Consultant. At least some of these tools are described further below.

A. International BIN Filtering

An examination of a payment facilitator's historical fraud data may show a high percentage of fraudulent transactions originating with certain international cards. A payment facilitator user can limit its exposure to this type of fraud by taking advantage of the International Card Filtering Service. This feature allows may allow the payment facilitator to filter MasterCard and Visa cards originating in either all foreign countries or selected foreign countries based upon the country of the card issuer. Implementation of this feature may include, one or more of: receiving from the payment facilitator user, an authorization/sale transaction; determining the country of origin of a card used or to be used in the transaction. If the card originates outside the United States and the payment facilitator has elected to filter international cards, the integration system may decline the transaction. Likewise, if the payment facilitator has elected to filter a specific country or countries and the card originates from the designated country, the integration system may decline the transaction. Upon a decline, the integration system may output—an indication and/or cause for the decline (e.g., Restricted Card) on the user interface.

B. Prior Chargeback Filtering

A service for prior chargeback filtering may involve various configuration options. The prior chargeback filtering service may provide a payment facilitator with the capability to elect to filter transactions using a card for which a payment facilitator received a chargeback. Additionally or alternatively, the prior chargeback filtering service may provide a payment facilitator with the capability to elect to filter only the subset of transactions for which a payment facilitator may have received a fraud related chargeback (determine by the associated chargeback reason code). In both cases, the system may check a payment facilitator's historical data to see if the payment facilitator received an applicable chargeback from the same account within a prescribed time in the past, e.g., the last 90 days. Upon a decline, the integration system may output an indication of the cause for decline (e.g., Restricted Card—Chargeback) on the user interface.

C. Security Code No-Match Filter

As may be known to those having ordinary skill in the art, 3 or 4 digit security codes may act as a verification that a person ordering a payment facilitator's product in a card-not-present environment may have physical possession of the card. While this validation can be a useful anti-fraud tool, some issuing banks may not necessarily decline a transaction based upon a failure to match the security code. Thus, in some scenarios, declining the transaction may be left to the discretion of the merchant.

If a payment facilitator elects to use the Security Code No-Match Filter Service, the integration system may take action if the issuer approves the submitted authorization/sale transaction, but may include a no-match code for the CVV2/CVC2/CID card validation check. Thus, the integration system may decline the transaction and output the cause for the decline (e.g., security code mismatch) on to the user interface. The integration system may also issue an authorization reversal transaction on the payment facilitator's behalf to remove the funds held on the account.

D. Card Velocity Filtering

Often, when a person attempts to use a stolen credit card successfully, they may follow the initial purchase with a number of additional purchases within a short period of time. If a payment facilitator elects to use the Card Velocity Filter, the integration system may filter the transaction based upon the number of previously approved Auth/sale transactions plus the number of authorization/sale transactions declined by another filter, for the same account within a designated time period. Both the total number of transactions and the time period may be configured or linked to the stored profile of the merchant.

Upon a decline, the integration system may output a cause for the decline (e.g., a Restricted Card—Auth Fraud Velocity Filtering Service) on to the user interface.

E. Prior Fraud Advice Filtering

The integration system may maintain a database of Fraud Advice information received from various payment networks (e.g., Visa, MasterCard, etc.) for transactions that a payment facilitator may have processed in immediate past (e.g., the last 200 days). If a payment facilitator uses the Prior Fraud Advice Filter, the integration system may compare the account information from the new transaction against the database of accounts with prior Fraud Advice and may filter the transaction if there is a match.

Upon a decline, the integration system may output the cause for the decline (e.g., Restricted Card—Auth Fraud Advice Filtering Service) on to the user interface.

F. AVS Filter

One of the fraud prevention tools provided by various card networks may be an address verification system (AVS). By submitting the customer's address information, a payment facilitator can verify that the address/zip code supplied by a consumer matches an issuer's records. The card networks, however, may not decline transactions based upon the failure to match the address or zip code. Using the AVS Filter, a payment facilitator can filter potentially fraudulent transactions based upon failure to match one or more of: an address, and/or a zip/postal code.

Upon a decline, the system may output the cause for the decline (e.g., Restricted Card—Fraud AVS Filtering Service) on to the user interface.

G. Email Velocity Filter

Often, card testers or other bad actors may submit a number of transaction using multiple cards, but with a common email address. If the payment facilitator were to collect and include the consumer's email address with each transaction, the integration system may communicate the email address to a sub-system or third party system involved with analyzing fraud (e.g., ThreatMetrix), who may track and analyze the information. If the filter detects that an email of a consumer was used in a pre-configured number of transactions within the pre-configured period of time, the integration system may decline new transactions (using the same email) on the payment facilitator's behalf and may output the cause for the decline (e.g., ThreatMetrix Fraud Score Below Threshold) on to the user interface.

H. Phone Velocity Filter

Similar to email, card testers or other bad actors may often submit a number of transaction using multiple cards, but with a common phone number. A payment facilitator may collect and include a consumer's phone number with each transaction involving the consumer. The integration system may communicate the phone number to a sub-system or third party system involved with analyzing fraud (e.g., ThreatMetrix), who may track and analyze the information, including the consumer's phone number. If the filter used by the sub-system or third-party system detects that the same phone number was used in a pre-configured number of transactions within a pre-configured period of time, the integration system may decline new transactions (using the same phone number) on the payment facilitator's behalf and may output the cause for the decline (e.g., Restricted Device or IP—ThreatMetrix Fraud Score Below Threshold) on to the user interface.

I. IP Velocity Filter

The IP Velocity filter may allow a sub-system or third party system involved with analyzing fraud (e.g., ThreatMetrix) to perform IP interrogation/piercing to determine the true internet protocol (IP) Address of a device originating a transaction order, e.g., using program code installed in the payment facilitator's system. As with other velocity filters (e.g., Email Velocity Filter, Phone Velocity Filter, etc.), if the filter detects that the same IP Address may have been used in a pre-configured number of transactions within a pre-configured period of time, the integration system may decline new transactions from the same IP Address on the payment facilitator's behalf and may output the cause for decline (e.g., Restricted Device or IP—ThreatMetrix Fraud Score Below Threshold) on to the user interface. In some embodiments, a payment facilitator can include the originating IP Address that a payment facilitator may detect in a payment facilitator transaction for the sub-system or third party system to implement the IP Velocity filter.

J. Device Velocity Filter

The Device Velocity filter may allow a sub-system or third party system involved with analyzing fraud (e.g., ThreatMetrix) to construct a device fingerprint of the system originating a transaction order. As with other velocity filters (e.g., Email Velocity Filter, Phone Velocity Filter, IP Velocity Filter, etc.), if the filter detects that the same device may have been used in a pre-configured number of transactions within a pre-configured period of time, the integration system may decline new transactions from the same device on the payment facilitator's behalf and may output the cause for the decline (e.g., Restricted Device or IP—ThreatMetrix Fraud Score Below Threshold) on to the user interface.

Application of Filters—Filtering Rules

Rules for filtering ("filtering rules") may be defined as part of a payment facilitator's merchant profile. While a payment facilitator can have all submitted transactions flow through the Fraud toolkit, a payment facilitator user may want to exercise a finer control over the application of the filters based upon a particular product, service, or other criteria. The integration system may thus provide the payment facilitator with the flexibility of restricting which transactions may be submitted to the filtering service, and which filters the integration system may apply to which groups. This may be accomplished by defining or prompting the payment facilitator user to define the filtering rules.

For each filtering rule a payment facilitator may define a subgroup of transactions, e.g., by selecting a flow selector. In some embodiments, the flow selectors may include, but are not limited to: Report Group, Billing Descriptor, orderSource, or merchant ID (MID) (for payment facilitators, flow control by MID or order source). After selecting a particular Flow Selector, a payment facilitator may then select which filters to have applied to that subset of transactions. A payment facilitator can define the Filter Rules so that filters are ORed (transaction filtered when any one of the filters conditions met), or ANDed (transaction filtered when multiple filter conditions met).

Secure Scheduled Reports (SSR)

In some embodiments, the integration system may include a Scheduled Secure Reports (SSR) service, which may refer to an automated service designed to create one or more predefined reports and make them available to the payment facilitator. This service may provide the several benefits, namely, security, flexibility, reliability, accuracy, and the ability to evolve with data and technology. For example, reports may be delivered through secure FTP, minimizing the risk of data compromise. The report FTP account may be unique and distinct from a payment facilitator's transaction processing FTP account, thereby improving access control to the payment facilitator's reporting data. Furthermore reports can be accessible in a payment facilitator's secure FTP directory, e.g., for up to thirty days. Built-in features of the SSR or the integration system may automatically detect if a scheduled report did not run on time, allowing the integration system to address delivery issues promptly.

Scheduled reports may be consistent with reports available in the integration system's payment facilitator analytic dashboard. Additionally, new fields added to scheduled reports may be included automatically, providing a complete and valuable data set. New fields may be appended to the end of each data set to avoid disruption to automated parsing mechanisms.

SSR may include general reports, including, but not limited to the following: A Net Settled Sales by Transaction Report, A Session Report, A Transaction Summary Report, An Activity Report, A Settlement Report, A Chargeback Financial Report, A Chargeback Status Report, A Fraud Alert Report, A Fee Report, An eCheck Notices of Change (NoC) Report, payment facilitator Reports (e.g., for a managed or dynamic payout funding solutions), etc.

A Net Settled Sales by Transaction Report may include settled and conveyed transactions (e.g., deposits and refunds), including eCheck transactions. This report may be scheduled based upon Activity (post) or Settlement (funds transfer) day.

A Session Report may include transactions for a particular activity post day and may allow reconciliation against submitted transactions.

A Transaction Summary Report may include summarized deposits and refunds (both settled and conveyed) submitted by the merchant and broken down by purchase currency, reporting groups, and payment type for a particular activity post day.

An Activity Report may include summarized financial data for transactions (deposits and refunds) based upon activity post date and broken down by Reporting Group and payment type.

A Settlement Report may include summarized financial data for settled transactions (deposits and refunds) based upon settlement (funds transfer) date and broken down by Reporting Group and payment type.

A Chargeback Financial Report may include detailed information about financial impacting chargeback activities for a given activity (post) or fund transfer (settlement) date.

A Chargeback Status Report may provide details of chargeback activities for a designated activity (post day) date or date range in the case of a monthly report. This report may run periodically (e.g., daily or monthly).

A Fraud Alert Report may provide a list of MasterCard and Visa transactions confirmed to be fraudulent.

A Fee Report may provide a detailed breakdown of the integration system and Passthrough (Interchange) fees associated with transactions for a given activity (post) or fund transfer (settlement) date.

An eCheck NoC Report may provide updated account information for a payment facilitator's use in updating a payment facilitator's customer files, including bank routing numbers, account numbers, and account names. The report may be produced daily and may be deleted after 24 hours.

Additionally, SSR may be payment facilitator Reports. For example, payment facilitators Reports for a managed payout funding solution may include one or more of the following:

A Submerchant Financial Summary Report may include financial data for funds transfers to submerchants. The information in the report may be based upon the settlement transfer date. The report may be produced periodically (e.g., daily, weekly, etc.).

A payment facilitator Fee Report—contains financial data for fees assessed to submerchants enabled for submerchant funding. The information in the report may be based upon the settlement transfer date. The report may be produced periodically (e.g., daily, weekly, etc.).

A Submerchant Funds Transfer NoC Report may contain NoC data detailing changes in submerchants accounts discovered during funds transfer operations. The report may be produced daily and may be deleted after 24 hours.

A Failed Submerchant Fund Transfer Report—contains data about failures to transfers funds to submerchants accounts. The report is produced daily.

A Tax ID Mismatch Report—contains data about legal entity Tax Identification Numbers validation failures. The report may be produced periodically (e.g., daily, weekly, etc.).

payment facilitators Reports for a dynamic payout funding solution may include one or more of the following:

A Funding Reject Report by ACH Return Date may contain data about failures to transfers funds to submerchants accounts. The report may be produced periodically (e.g., daily, weekly, etc.).

An NoC Report by ACH Return Date—contains NoC data detailing changes in submerchants accounts discovered during funds transfer operations. The report is produced daily and deleted after 24 hours.

An Account Balance Report—contains data about balances in various accounts used by this solution. The report may be produced periodically (e.g., daily, weekly, etc.). A Tax ID Mismatch Report (same as above)—contains data about legal entity Tax Identification Numbers validation failures. The report may be produced periodically (e.g., daily, weekly, etc.).

A Funding Instruction Confirmation Report may provide data about previously settled funding instructions, e.g., from the previous day.

A Balance Summary Report may provide a summary of the balance in the payment facilitator account for the near past (e.g., the previous day).

Payment Facilitator Reconciliation Dashboard

Figure 10:
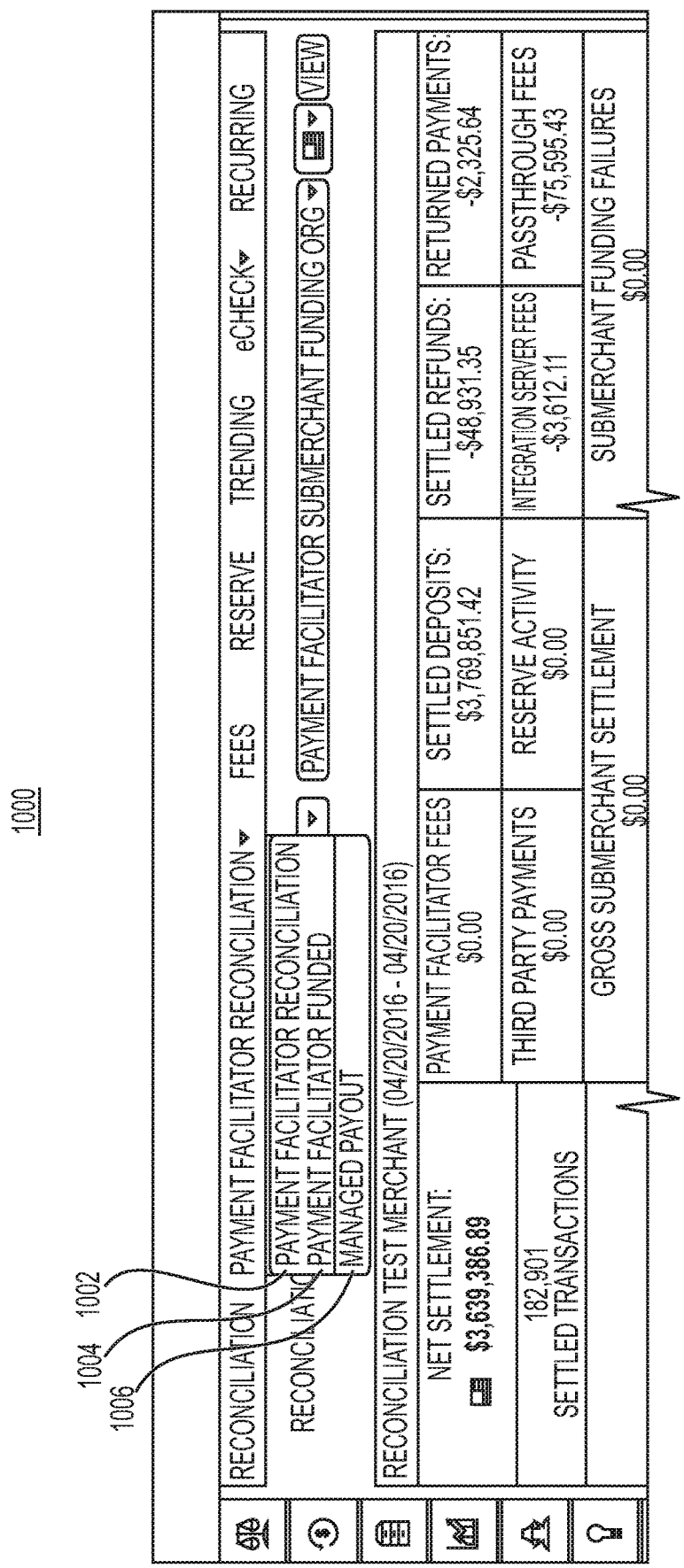
FIG. 10 depicts an exemplary screenshot of a user interface for a system of automated integration and payout funding between payment facilitators and submerchants, displaying a reconciliation dashboard, in accordance with non-limiting embodiments.

The payment facilitator Reconciliation Dashboard 100 (e.g., as shown in FIG. 10) may provide a compact tool for payment facilitators who may use a managed payout funding model for accessing data when performing financial reconciliation. This dashboard may reduce the need to access multiple reports. For example, pertinent information from the Activity Report, Settlement Report, and Transaction Summary Report, along with other relevant data, may be assembled on the same screen for easy access.

The payment facilitator Reconciliation Dashboard may include three report views (as shown in FIG. 10).

Payment facilitator Reconciliation 1002 may be a cumulative view of reconciliations to both the payment facilitator and submerchants. Payment facilitator Funded 1004 may include reconciliations to the payment facilitator when submerchant funding is not utilized (e.g., standard funding).

Managed payout 1006 may include reconciliations to the payment facilitator and submerchants when managed payout submerchant funding is utilized. A payment facilitator user can view one or more of these payment facilitator Reconciliation reports by Activity (post) date and/or by Settlement (funds transfer) date. In some embodiments, summary data may be presented in the top frames of the display, and other detailed data may be presented in various frames below.

The Account Summary Report may also be accessible from the payment facilitator Reconciliation menu, and may include account balances and detailed information on the instructions and activities for each account type. The Account Summary report may be available to payment facilitators who use the dynamic payout submerchant funding method. In some embodiments, the dashboard may further include functionalities for CSV and Excel Report Exporting 908, e.g., to export data on net settled sales by transaction, fees, chargebacks/returns activity, and reserve activity. A user can also export submerchant funding reports from the settlement by funds transfer panel. In other embodiments, the dashboard may further include links to reports with more detailed information, e.g., returned payments reports that may provide a detailed listing of all chargebacks and eCheck; ACH returns associated with the selected transactions; fee report(s) that may provide a detailed breakdown of the integration system and pass-through (Interchange) fees associated with the selected transactions; and a reserve report, which may show a chronological list of the activities associated with the selected transactions that influence a payment facilitator's organization's reserve account.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of automated integration of data and user interface between payment facilitators and submerchants, the method comprising:
   receiving and storing an identifier and financial information of a payment facilitator, wherein the identifier and the financial information are tokenized, and wherein the tokenized financial information is encrypted;
   registering the payment facilitator as a user of the user interface;
   receiving a command from the payment facilitator via one or more user interface elements of the user interface, the command being one of:
     register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant;
     view or edit details of the legal entity or the submerchant;
     perform a search of legal entities or submerchants associated with the payment facilitator, using one or more search criteria; and
     add, view, edit, and assign fee profiles.

2. The method of claim 1, further comprising, if the received command is to register the legal entity or the submerchant:
   receiving, from the payment facilitator or a memory, financial and identifying information pertaining to the legal entity or the submerchant;
   entering information into data fields for the financial and identifying information of the legal entity or the submerchant based on the received financial and identifying information;
   performing one or more iterations of:
     validating, using a processor, the information stored in the data fields based on preconfigured validation constraints, wherein the validating includes determining whether the data fields include invalid or missing data;
     if the data fields include invalid or missing data, prompting the payment facilitator to correct the invalid data or the missing data;
   if the data fields do not include invalid or missing data, performing a background check on the legal entity or the submerchant, using the received identifying and financial information, wherein the performance of the background check results in one or more of an acceptance, a decline, or a soft decline of the legal entity or the submerchant; and
   if the result of the background check of the legal entity or the submerchant is an acceptance, registering the legal entity or the submerchant by storing an indication of the acceptance and an association with the payment facilitator.

3. The method of claim 2, wherein, if the result of the background check of the legal entity or the submerchant is a soft decline,
   enabling a manual review of the background check of the legal entity or the submerchant by an assigned third party; and
   receiving and storing notes based on the manual review.

4. The method of claim 3, further comprising:
   enabling the assigned third party to update at least one of the data fields for the financial and identifying information of the legal entity or the submerchant, based on the manual review.

5. The method of claim 2, wherein, if the result of the background check of the legal entity or the submerchant is a soft decline, designating a pending state of registration of the legal entity or the submerchant by indicating the pending state of registration in a data structure of the memory.

6. The method of claim 5, further comprising,
   determining, by querying the memory, whether there is a registered legal entity or a registered submerchant that shares a common financial or common identifying information with the legal entity or the submerchant having a pending state of registration;
   if there is a registered legal entity or the registered submerchant that shares the common financial or common identifying information, registering the legal entity or the submerchant having the pending state of registration by indicating the registration in a data structure of the memory.

7. The method of claim 6, wherein the common financial or common identifying information includes a tax identification.

8. The method of claim 2, further comprising:
   enabling the payment facilitator, through the user interface, to input a selection of a payout method for one or more of the registered legal entities or the registered submerchants of the payment facilitator; and
   receiving and storing the selection of the payout method by the payment facilitator.

9. The method of claim 8, further comprising:
   processing a payout transaction based on the selected payout method between the payment facilitator and one or more of the legal entities or the submerchants, using the financial and identifying information of the payment facilitator, the legal entities, or the submerchants.

10. The method of claim 1, further comprising, if the command is to view or edit details of the legal entity or the submerchant:
    enabling the payment facilitator to input one or more of the following commands: view the legal entity or the submerchant, disable the submerchant, add or delete identifying and ownership information of a principal owner of the legal entity or the submerchant, and edit an identifying or financial information of the legal entity or the submerchant; and
    performing one or more of the commands based on a received input from the payment facilitator.

11. The method of claim 1, further comprising:
    displaying predefined reports comprising one or more of:
    a summary and result of a background check of one or more legal entities or submerchants of the payment facilitator;
    a report of reconciliations between or to the payment facilitator, legal entities or submerchants;
    scheduled secure reports, including one or more of: a net settled sales by transaction report, a session report, a transaction summary report, an activity report, a settlement report, a chargeback financial report, a chargeback status report, a fraud alert report, a fee report, an eCheck notice of change (NoC) report, or a report of the payment facilitator based on a selected payout method.

12. The method of claim 1, further comprising:
    receiving collective transaction information from the payment facilitator on transactions incurred by the submerchants of the payment facilitator over a predetermined duration of time; and
    displaying the collective transaction information on the user interface.

13. The method of claim 12, further comprising:
    tokenizing or encrypting one or more of the received transaction information or the received financial and identifying information of the legal entities or the submerchants.

14. The method of claim 12, wherein the user interface enables the payment facilitator to decline one or more transactions or apply a filter to determine which transactions may be declined.

15. The method of claim 14, wherein the filters include one or more of an AVS filter; a CVV No-Match filter; an international BIN filter; a prepaid non-reloadable filter; a prior chargeback filter; a prior fraud advice filter; a card velocity filter; an email velocity filter; a phone velocity filter; an IP velocity filter; or a device velocity filter.

16. The method of claim 12, further comprising:
    enabling the payment facilitator to input a command to execute one or more of the following transactions:
    an authorization transaction, a partial capture transaction, an address verification system (AVS) only transaction, an authorization reversal, a capture transaction, a capture given authorization transaction, a credit transaction, a sale transaction, or a void transaction.

17. A system for automated integration of data and user interface between payment facilitators and submerchants, the system comprising:
    a processor of an integration system configured to receive and store an identifier and financial information of a payment facilitator and registering the payment facilitator as a user of the user interface, wherein the identifier and the financial information are tokenized, and wherein the tokenized financial information is encrypted;
    a processor of a user device configured to generate and display the user interface enabling the payment facilitator to input one or more of the following commands via one or more user interface elements of the user interface:
    register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant;
    view or edit details of the legal entity or the submerchant;
    perform a search of legal entities or the submerchants associated with the payment facilitator, using a search criteria; and
    add, view, edit, and assign fee profiles to the legal entity or the submerchant; and memory storing instructions for generating and displaying the user interface.

18. The system of claim 17, wherein the memory further stores instructions for automated integration between payment facilitators and submerchants; and
a processor is configured to execute the instructions to perform a method including, if the received command is to register the legal entity or the submerchant:
receiving, from the payment facilitator or a memory, financial and identifying information pertaining to the legal entity or the submerchant;
entering information into data fields for the financial and identifying information of the legal entity or the submerchant based on the received financial and identifying information;
performing one or more iterations of:
validating, using a processor, the information stored in the data fields based on preconfigured validation constraints, wherein the validating includes determining whether the data fields include invalid or missing data;
if the data fields include invalid or missing data, prompting the payment facilitator to correct the invalid data or the missing data;
if the data fields do not include invalid or missing data, performing a background check on the legal entity or the submerchant, using the received identifying and financial information, wherein the performance of the background check results in one or more of an acceptance, a decline, or a soft decline of the legal entity or the submerchant; and
if the result of the background check of the legal entity or the submerchant is an acceptance, registering the legal entity or the submerchant by storing an indication of the acceptance and an association with the payment facilitator.

19. The system of claim 17, further configured for:
generating and displaying a user interface enabling a payment facilitator to input one or more of the following additional commands:
execute or decline one or more transactions or apply a filter to determine which transactions may be declined;
view one or more predefined reports; and
select a payout method for one or more of the registered legal entities or registered submerchants; and
performing one or more of the commands based on a received input from the payment facilitator.

20. A non-transitory machine-readable medium storing instructions that, when executed by a computing system, enables the computing system to perform a method for automated integration of data and user interface between payment facilitators and submerchants, the method including:
receiving and storing an identifier and financial information of a payment facilitator, wherein the identifier and the financial information are tokenized, and wherein the tokenized financial information is encrypted;
registering the payment facilitator as a user of the user interface;
receiving a command from the payment facilitator via one or more user interface elements of the user interface, the command being one of:
register a legal entity or a submerchant, wherein the registering associates the legal entity or the submerchant with the payment facilitator, validates financial and identifying information pertaining to the legal entity or the submerchant, and is based on an acceptance after a background check of the legal entity or the submerchant;
view or edit details of the legal entity or the submerchant;
perform a search of legal entities or submerchants associated with the payment facilitator, using one or more search criteria; and
add, view, edit, and assign fee profiles to the legal entity or the submerchant.

* * * * *